United States Patent
Gao et al.

(10) Patent No.: US 9,986,581 B2
(45) Date of Patent: May 29, 2018

(54) MULTI-USER MULTIPLE-INPUT-MULTIPLE-OUTPUT SCHEDULING

(71) Applicant: QUALCOMM Incorporated, San Diego, CA (US)

(72) Inventors: Qinghai Gao, Sunnyvale, CA (US); Ahmed Ragab Elsherif, Santa Clara, CA (US); Xiaolong Huang, Morgan Hill, CA (US); Guido Robert Frederiks, Watsonville, CA (US); Chao Zou, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 138 days.

(21) Appl. No.: 14/847,551

(22) Filed: Sep. 8, 2015

(65) Prior Publication Data

US 2016/0338080 A1    Nov. 17, 2016

Related U.S. Application Data

(60) Provisional application No. 62/161,661, filed on May 14, 2015.

(51) Int. Cl.
*H04L 12/863*    (2013.01)
*H04W 72/12*    (2009.01)
(Continued)

(52) U.S. Cl.
CPC ........ *H04W 72/121* (2013.01); *H04B 7/0452* (2013.01); *H04L 43/0852* (2013.01);
(Continued)

(58) Field of Classification Search
CPC ................ H04B 7/0452; H04W 72/00; H04W 72/1278; H04W 28/08; H04L 47/125; H04L 47/50
See application file for complete search history.

(56) References Cited

U.S. PATENT DOCUMENTS

| 2013/0301569 A1 | 11/2013 | Wang et al. |
| 2014/0269962 A1 | 9/2014 | Gao et al. |

(Continued)

FOREIGN PATENT DOCUMENTS

| EP | 2495884 A2 | 9/2012 |
| WO | WO-2012097337 A1 | 7/2012 |

OTHER PUBLICATIONS

ISA/EP, International Search Report and Written Opinion of the International Searching Authority, Int'l. App. No. PCT/US2016/032119, dated Aug. 22, 2016, European Patent Office, Rijswijk, NL, 10 pgs.

*Primary Examiner* — Salvador E Rivas
(74) *Attorney, Agent, or Firm* — Holland & Hart LLP

(57) ABSTRACT

Methods, systems, and devices are described for wireless communication. In one aspect, a method of wireless communication includes determining a transmit time metric associated with each transmission group of a number of transmission groups based at least in part on an amount of data in a transmit queue and a modulation and coding scheme (MCS) data rate for at least one wireless communication device in the transmission group. The method also includes scheduling a transmission to a first transmission group of the number of transmission groups based at least in part on the transmit time metric for the first transmission group.

30 Claims, 18 Drawing Sheets

(51) Int. Cl.
*H04L 12/26* (2006.01)
*H04B 7/0452* (2017.01)
*H04W 72/00* (2009.01)
*H04W 4/08* (2009.01)
H04W 28/08 (2009.01)
H04L 12/803 (2013.01)

(52) U.S. Cl.
CPC ............... *H04L 47/50* (2013.01); *H04W 4/08* (2013.01); *H04W 72/00* (2013.01); *H04L 47/125* (2013.01); *H04W 28/08* (2013.01)

(56) References Cited

U.S. PATENT DOCUMENTS

| | | | |
|---|---|---|---|
| 2014/0307653 A1 | 10/2014 | Liu et al. | |
| 2015/0071190 A1* | 3/2015 | Lau | H04B 7/0417 370/329 |
| 2015/0124690 A1 | 5/2015 | Merlin et al. | |
| 2015/0146654 A1* | 5/2015 | Chu | H04W 72/1289 370/329 |
| 2015/0222346 A1* | 8/2015 | Garrett | H04B 7/0617 370/329 |
| 2015/0312012 A1* | 10/2015 | Bhanage | H04B 7/0452 370/336 |
| 2016/0156402 A1* | 6/2016 | Hoshino | H04B 7/0452 375/267 |

\* cited by examiner

| | MCS 9 | MCS 8 | MCS 7 | MCS 6 | MCS 5 | MCS 4 | MCS 3 | MCS 2 | MCS 1 | MCS 0 | SU ONLY |
|---|---|---|---|---|---|---|---|---|---|---|---|
| Top (n) STAs (TX Time) | A B C | D | E | F G | H | | | | | | I J K |

400-a

| | MCS 9/8 | MCS 8/7 | MCS 7/6 | MCS 6/5 | MCS 5/4 | SU ONLY |
|---|---|---|---|---|---|---|
| Top (n) STAs (TX Time) | A B C | D E F G | | H I J K | | |

400-b

MULTI-USER MULTIPLE-INPUT-MULTIPLE-OUTPUT SCHEDULING

CROSS REFERENCES

The present application for patent claims priority to U.S. Provisional Patent Application No. 62/161,661 by Gao et al., entitled "Multi-User Multiple-Input-Multiple-Output Scheduling," filed May 14, 2015, assigned to the assignee hereof, and expressly incorporated by reference herein.

BACKGROUND

The following relates generally to wireless communication, and more specifically to multi-user multiple-input-multiple-output (MU-MIMO) scheduling.

Wireless communications systems are widely deployed to provide various types of communication content such as voice, video, packet data, messaging, broadcast, and so on. These systems can be multiple-access systems capable of supporting communication with multiple users by sharing the available system resources (e.g., time, frequency, and power). A wireless network, for example a wireless local area network (WLAN), can include an access point (AP) that may communicate with one or more stations (STAs) or mobile devices. The AP may be coupled to a network, such as the Internet, and enable a mobile device to communicate via the network (or communicate with other devices coupled to the access point). A wireless device may communicate with a network device bi-directionally. For example, in a WLAN, an STA may communicate with an associated AP via downlink (DL) and uplink (UL). The DL (or forward link) refers to the communication link from the AP to the STA, and the UL (or reverse link) refers to the communication link from the STA to the AP.

An AP may communicate with more than one STA simultaneously using an MU-MIMO transmission. The AP may send an MU-MIMO transmission to a group of STAs (e.g., a transmission set) that are assigned the same group identifier (ID). However, some STAs in a transmission set can have little or no traffic to receive at a particular time when an MU-MIMO transmission is scheduled and may have transmission characteristics substantially different from other STAs in the multi user (MU) group. Such a disparity in traffic to be received and transmission characteristic between STAs in an MU group decreases wireless communication system efficiency and throughput.

SUMMARY

Systems, methods, and devices for multi-user multiple-input-multiple-output (MU-MIMO) scheduling are described. An access point (AP) (or another device) determines a transmit time metric associated with each transmission group of a number of transmission groups based at least in part on an amount of data in a transmit queue and a modulation and coding scheme (MCS) data rate for a wireless communication device in the transmission group. In this regard, the AP schedules a transmission to a first transmission group of the number of transmission groups based at least in part on the transmit time metric for the first transmission group. The AP may read a transmit queue snapshot (e.g., a reference associated with data to be transmitted to each STA from the AP) to determine the amount of data in the transmit queue for each of the wireless communication devices.

In some examples, a token management system is employed by the AP. For example, a token cost can be applied to the first transmission based at least in part on a type of the transmission (e.g., MU-3 (a transmission to three STAs), MU-2 (a transmission to two STAs), and single user (SU) (a transmission to a single STA)). Additionally, the AP may cap the transmit time at a particular time value for some wireless communication devices during the process of scheduling the first transmission group, then round the transmit time up to a nearest time interval boundary for determining a transmission duration of the first transmission group. Overhead associated with the first transmission group may be based at least in part on a multi-user sounding procedure transmission time. In some cases, anticipated overhead associated with the type of transmission is considered when assigning the wireless communication devices to transmission groups.

A method of wireless communication is described. In some examples, the method includes determining a transmit time metric associated with each transmission group of a plurality of transmission groups based at least in part on an amount of data in a transmit queue and a MCS data rate for at least one wireless communication device in the transmission group, and scheduling a transmission to a first transmission group of the plurality of transmission groups based at least in part on the transmit time metric for the first transmission group.

A communications device is described. In some examples, the communications device includes a transmit time metric manager for determining a transmit time metric associated with each transmission group of a plurality of transmission groups based at least in part on an amount of data in a transmit queue and a MCS data rate for at least one wireless communication device in the transmission group, and a transmission scheduler for scheduling a transmission to a first transmission group of the plurality of transmission groups based at least in part on the transmit time metric for the first transmission group.

A further communications device is described. In some examples, the communications device includes a processor, memory in electronic communication with the processor, and instructions stored in the memory and operable, when executed by the processor, to cause the communications device to determine a transmit time metric associated with each transmission group of a plurality of transmission groups based at least in part on an amount of data in a transmit queue and a MCS data rate for at least one wireless communication device in the transmission group, and schedule a transmission to a first transmission group of the plurality of transmission groups based at least in part on the transmit time metric for the first transmission group.

A non-transitory computer-readable medium storing code for wireless communication is described. In some examples, the code includes instructions executable to determine a transmit time metric associated with each transmission group of a plurality of transmission groups based at least in part on an amount of data in a transmit queue and a MCS data rate for at least one wireless communication device in the transmission group, and schedule a transmission to a first transmission group of the plurality of transmission groups based at least in part on the transmit time metric for the first transmission group.

Some examples of the method, devices, or non-transitory computer-readable medium described herein may further include processes, features, means, or instructions may include assigning each of the plurality of wireless communication devices to at least one transmission group of the plurality of transmission groups based at least in part on a transmission characteristic selected from the group consisting of: a MCS for each of the plurality of wireless communication devices and the amount of data in the transmit queue in each of the plurality of wireless communication devices. Additionally or alternatively, some examples may include processes, features, means, or instructions for assigning the plurality of wireless communication devices to the plurality of transmission groups further comprises determining that at least two wireless communication devices of the plurality of wireless communication devices are compatible for a multi-user transmission based at least in part on a shared bandwidth between the at least two wireless communication devices.

Some examples of the method, devices, or non-transitory computer-readable medium described herein may further include processes, features, means, or instructions for reading a transmit queue snapshot to determine the amount of data in the transmit queue for each of the plurality of wireless communication devices. Additionally or alternatively, some examples may include processes, features, means, or instructions for scheduling the transmission to the first transmission group further comprises checking a number of available tokens for each wireless communication device of the first transmission group to determine whether to allow the transmission.

Some examples of the method, devices, or non-transitory computer-readable medium described herein may further include processes, features, means, or instructions for transmitting the transmission to the first transmission group, and reducing the number of available tokens for each wireless communication device of the first transmission group to determine whether to allow the transmission. Additionally or alternatively, in some examples the token cost is based at least in part on a type of the transmission associated with the first transmission group. Additionally or alternatively, in some examples the token cost the token cost is greater when the transmission of the first transmission group is a single-user transmission than when the transmission of the first transmission group is a multi-user transmission Some examples of the method, devices, or non-transitory computer-readable medium described herein may further include processes, features, means, or instructions for determining the transmit time metric comprises calculating a transmit time for the at least one wireless communication device from the amount of data in the transmit queue and the MCS data rate for the at least one wireless communication device, and capping the transmit time at a maximum time value. Additionally or alternatively, some examples may include processes, features, means, or instructions for determining the transmit time metric comprises calculating a transmit time for the at least one wireless communication device from the amount of data in the transmit queue and the MCS data rate for the at least one wireless communication device, and rounding the transmit time up to a nearest time interval boundary.

Some examples of the method, devices, or non-transitory computer-readable medium described herein may further include processes, features, means, or instructions for determining the transmit time metric for each of the plurality of transmission groups is further based at least in part on an overhead associated with the first transmission group. Additionally or alternatively, in some examples the overhead associated with the first transmission group is based at least in part on a multi-user sounding procedure transmission time.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

Aspects of the disclosure are described in reference to the following figures.

DETAILED DESCRIPTION

Figure 1:
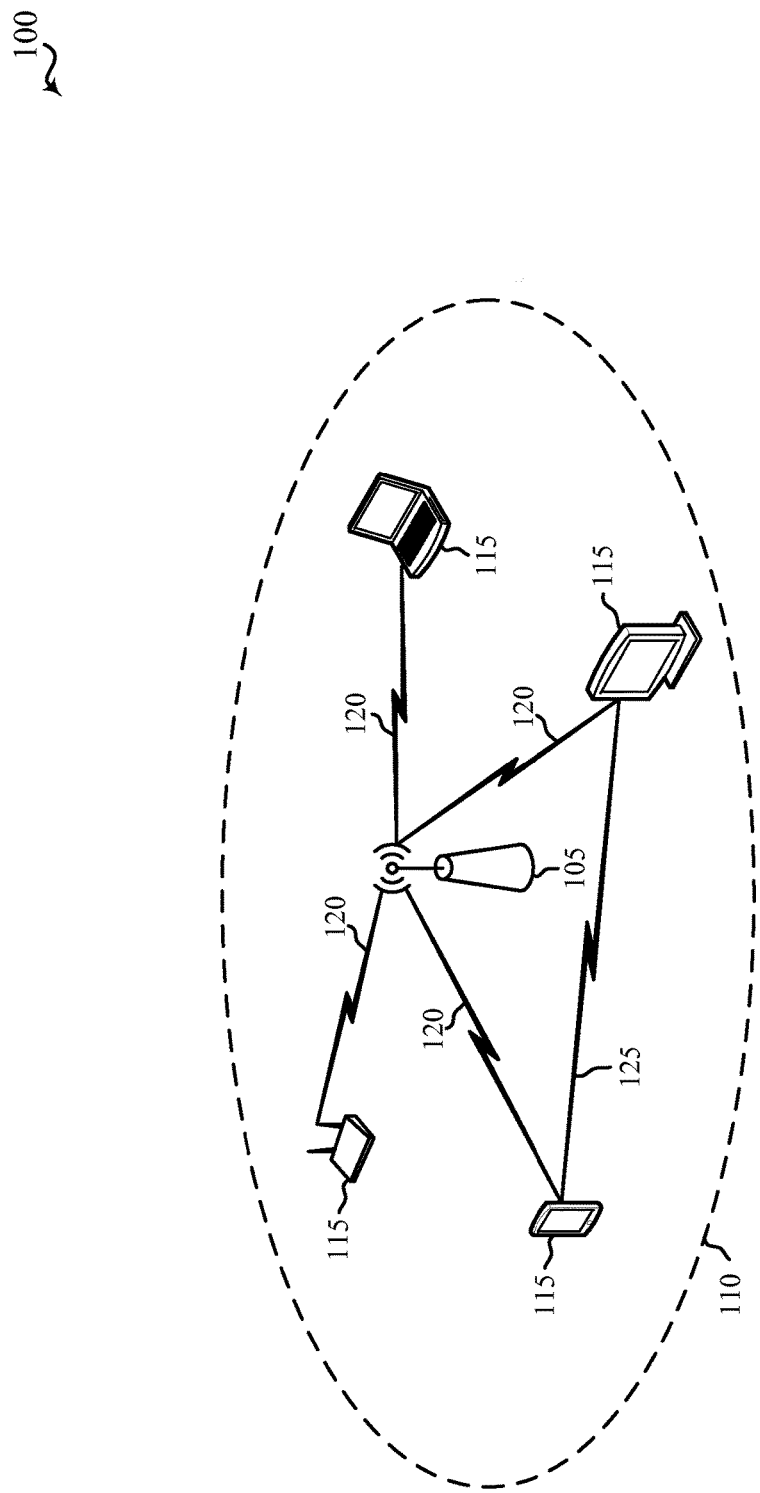
FIG. 1 illustrates a wireless local area network (WLAN) for multi-user multiple-input-multiple-output (MU-MIMO) scheduling configured in accordance with various aspects of the present disclosure

In multi-user multiple-input-multiple-output (MU-MIMO) scheduling, a multi user (MU) group can be formed with a plurality of stations (STAs) by an access point (AP) (or another device) for simultaneous transmission to each of the plurality of STAs. For example, an MU group may include two STAs, three STAs, four STAs, five STAs, etc. To obtain advantages associated with MU-MIMO operation, it can be beneficial to group as many STAs as practical for a given transmission. Criteria for grouping STAs for MU-MIMO transmission include, but is not limited to, having the same or comparable modulation and coding scheme (MCS) values, having a sufficient amount of packets for transmission, having uncorrelated channels, and/or having compatible transmission attributes. For example, to mitigate MU-MIMO transmissions with padding or filler packets, if an MU group includes a first STA, second STA, and a third STA, and the AP has a large queue of packets for transmission to the first and second STAs, and the AP has only a small queue of packets for transmission to the third STA, an MU-MIMO transmission of that MU group can be characterized by a shorter transmission duration of fewer packets than the total number of packets in the queue for both the first and second STAs. In such an example, lower throughput may result due to less aggregation of packets in the queue and overhead associated with additional channel measurement (e.g., sounding) and random back-off procedures.

Alternatively, an MU-MIMO transmission of that MU group can be characterized by a longer transmission duration of all or many packets in the queue for both the first and second STAs, and a large amount of padding or filler packets for the third STA. In this alternative example, lower throughput may also result due to the large amount of padding or filler packets in the MU-MIMO transmission. Accordingly, techniques for MU-MIMO operation include selecting an optimized MU group that can include grouping a lower number of STAs based at least in part on optimizing throughput by reducing an amount of padding or filler packets associated with a particular STA that may be a candidate for an MU group. Additionally, aspects of fairness in transmission opportunity may be incorporated in techniques for MU-MIMO scheduling in accordance with aspects of the present disclosure.

The importance of STA selection for an MU group may increase when firmware memory of an AP (or another device) is limited. As compared to fixed MU grouping employing round-robin scheduling, which may provide simplicity in station selection, techniques for MU-MIMO scheduling and transmission according to the present disclosure can include dynamic selection of STAs based at least in part on current traffic and transmission characteristics of the STAs, thereby accounting for bursty data traffic environments (e.g., TCP/IP) and changing over the air (OTA) conditions.

Aspects of the disclosure are initially described in the context of a wireless communication system. Techniques for MU-MIMO scheduling are further described that may provide optimized transmissions (e.g., various MU and single user (SU) transmissions) and may overcome challenges associated with limited firmware memory for queuing packets of multiple STAs, bursty data traffic patterns, and/or changing multipath network conditions, for example. These and other aspects of the disclosure are further illustrated by and described with reference to apparatus diagrams, system diagrams, and flowcharts that relate to MU-MIMO scheduling.

FIG. 1 illustrates a WLAN 100 (also known as a Wi-Fi network) configured in accordance with various aspects of the present disclosure. The WLAN 100 includes an AP 105 and multiple associated STAs 115, which represent devices such as mobile stations, personal digital assistant (PDAs), other handheld devices, netbooks, notebook computers, tablet computers, laptops, display devices (e.g., TVs, computer monitors, etc.), printers, etc. The AP 105 and the associated STAs 115 may represent a basic service set (BSS) or an extended service set (ESS). The various STAs 115 in the network are able to communicate with one another through the AP 105. Also shown is a coverage area 110 of the AP 105, which may represent a basic service area (BSA) of the WLAN 100.

Although not shown in FIG. 1, an STA 115 may be located in the intersection of more than one coverage area 110 and associate with more than one AP 105. A single AP 105 and an associated set of STAs 115 may be referred to as a BSS. An ESS is a set of connected BSSs. A distribution system (DS) (not shown) may be used to connect APs 105 in an ESS. In some cases, the coverage area 110 of an AP 105 is divided into sectors (also not shown). The WLAN 100 may include APs 105 of different types (e.g., metropolitan area, home network, etc.), with varying and overlapping coverage areas 110. Two STAs 115 may also communicate directly via a direct wireless link 125 regardless of whether both STAs 115 are in the same coverage area 110. Examples of a wireless link 120 that is direct may include Wi-Fi Direct connections, Wi-Fi Tunneled Direct Link Setup (TDLS) links, and other group connections. STAs 115 and APs 105 may communicate according to the WLAN radio and baseband protocol for physical (PHY) and medium access control (MAC) layers from IEEE 802.11 and versions including, but not limited to, 802.11b, 802.11g, 802.11a, 802.11n, 802.11 ac, 802.11 ad, 802.11 ah, etc. In other implementations, peer-to-peer connections or ad hoc networks may be implemented within WLAN 100.

WLAN 100 may increase throughput by supporting certain scheduling and transmission techniques associated with multiple-input-multiple-output (MIMO) and MU-MIMO operations. A MIMO communication may involve multiple transmitter antennas (e.g., at an AP 105) sending a signal to multiple receive antennas (e.g., at an STA 115). Each transmitting antenna may transmit independent data (or spatial) streams which may increase diversity (e.g., spatial diversity) and the likelihood successful signal reception. In other words, MIMO techniques can use multiple antennas on an AP 105 or multiple antennas on an STA 115 to take advantage of multipath environments to transmit multiple data streams. In some cases, an AP 105 implements MU-MIMO transmissions in which the AP 105 simultaneously transmits independent data streams to multiple STAs 115. For example, in an MU-N transmission, an AP 105 simultaneously transmits signals to N STAs. The AP 105 may assign the STAs into MU-N transmission groups or an SU transmission group. Thus, when an AP 105 has traffic for many compatible STAs 115, the AP 105 can increase network throughput by aggregating individual streams for each STA 115 into a single, optimized MU-MIMO transmission.

An AP 105 may implement an identification scheme to distinguish the STAs 115 in a transmission group. For example, an AP 105 may assign a number of STAs 115 to a group identifier (ID). The STAs and group ID may be called an MU group. The assignment of the STAs may be based at least in part on the same or comparable MCS index values (e.g., differences in the MCS index value may be 0, +/−1, or +/−2 between STAs in an MU-N group), a sufficient amount of packets (e.g., a threshold amount of packets queued for the STA) for transmission, channels uncorrelated with STAs (e.g., so that coordinated transmission methods such as beamforming can be effectively utilized), and/or compatible transmission attributes (e.g., a similar bandwidth between STAs).

The AP 105 may further determine a transmit time metric associated with each transmission group. The transmit time metric may be based at least in part on an amount of data in a transmit queue and a MCS data rate for at least one STA 115 in the transmission group. In some implementations, the transmit time metric includes an amount of data in a transmit queue and a MCS data rate for each STA 115 in the transmission group. For example, AP 105 can read a snapshot of the transmit queue of AP 105 to determine the amount of data in the transmit queue for each of the STA 115. In this regard, the AP 105 schedules a transmission to a first transmission group based at least in part on the transmit time metric. An AP 105 may also check a number of available tokens for each STA 115 to determine whether to allow the transmission.

Figure 2:
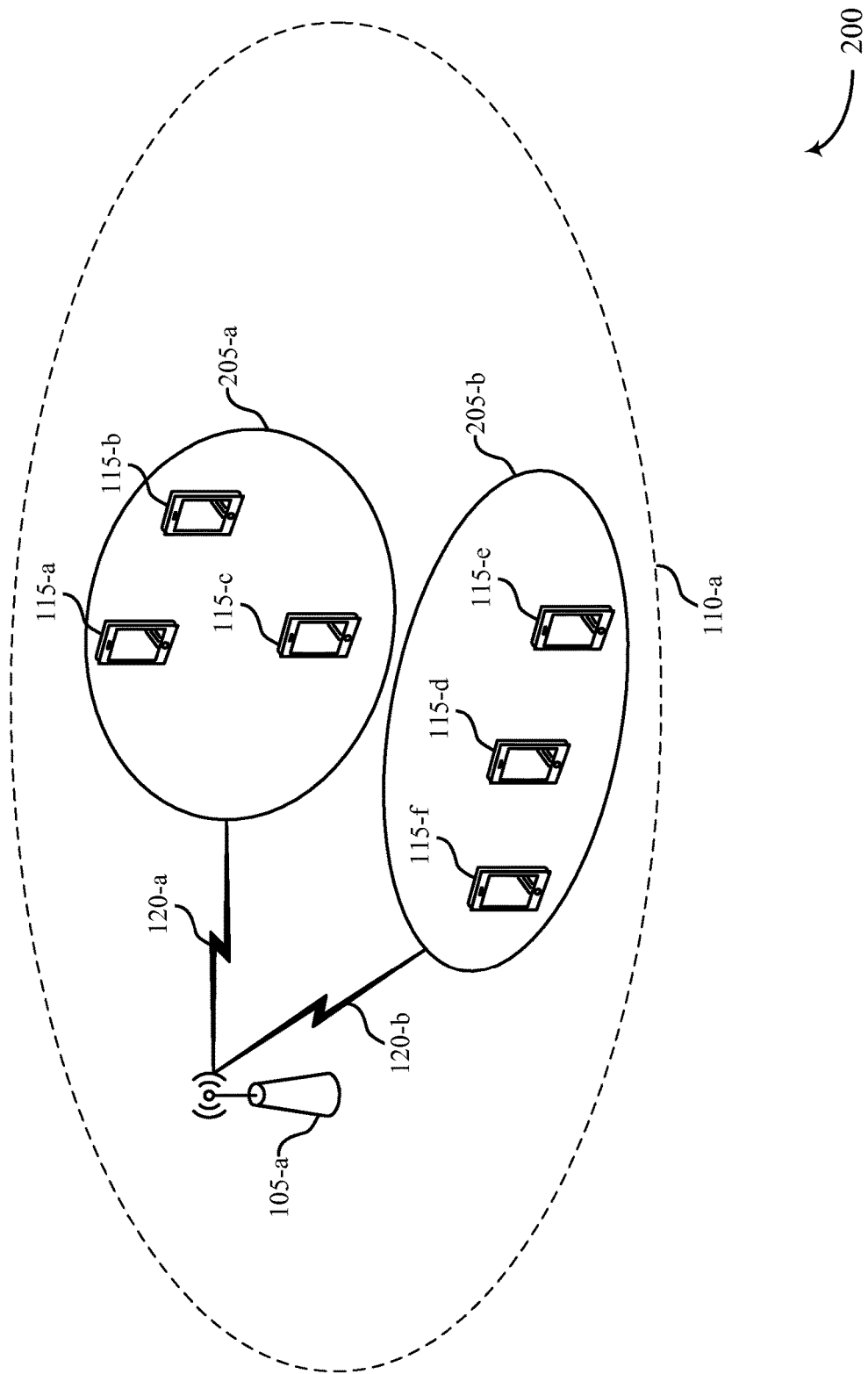
FIG. 2 illustrates an example of a wireless communications subsystem that supports MU-MIMO scheduling in accordance with various aspects of the present disclosure.

FIG. 2 illustrates an example of a wireless communications subsystem 200 that supports MU-MIMO scheduling of stations to MU groups in accordance with various aspects of the present disclosure. Wireless communications subsystem 200 may facilitate dynamic selection of STAs 115 and scheduling for MU transmissions. Wireless communications subsystem 200 may include AP 105-a, which may be an example of an AP 105 described with reference to FIG. 1. Wireless communications subsystem 200 may include MU group 205-a and MU group 205-b.

Each of MU group 205-a and MU group 205-b may include a number of STAs 115 based at least in part on a same or comparable MCS index values. In some examples, modulation types and coding rates for MCS index values correspond as follows: MCS index value 9 relates to 256-QAM (quadrature amplitude modulation) and 5/6 coding rate; MCS index value 8 relates to 256-QAM and 3/4 coding rate; MCS index value 7 relates to 64-QAM and 5/6 coding rate; MCS index value 6 relates to 64-QAM and 3/4 coding rate; MCS index value 5 relates to 64-QAM and 2/3 coding rate; MCS index value 4 relates to 16-QAM and 3/4 coding rate; MCS index value 3 relates to 16-QAM and 1/2 coding rate; MCS index value 2 relates to QPSK (quadrature phase shift keying) and 3/4 coding rate; MCS index value 1 relates to QPSK and 1/2 coding rate; and MCS index value 0 relates to BPSK (binary phase shift keying) and 1/2 coding rate. However, other modulation type and coding rate schemes may be used in accordance with aspects of the present disclosure.

In FIG. 2, MU group 205-a may include STA 115-a having a MCS index value of 9, STA 115-b having a MCS index value of 9, and STA 115-c having a MCS index value of 9. Each of the STAs 115 in MU group 205-a may also be determined to meet a transit time threshold (e.g., at least 2 ms or more) and be assigned a common group ID. The AP 105-a may determine that the STAs 115-a, 115-b, and 115-c in MU group 205-a are compatible for an MU transmission based at least in part on a shared bandwidth between each of STAs 115-a, 115-b, and 115-c.

MU group 205-b may include STA 115-d having a MCS index value of 7, STA 115-e having a MCS index value of 6, and STA 115-f having a MCS index value of 7. Each of the STAs 115 in MU group 205-b may also be determined to meet a transit time threshold (e.g., at least 2 ms or more) and be assigned a common group ID. Similarly, the AP 105-a may determine that the STAs 115-d, 115-e, and 115-f in MU group 205-b are compatible for an MU transmission based at least in part on a shared bandwidth between each of STAs 115-d, 115-e, and 115-f. According to some aspects, the shared bandwidth for MU group 205-a does not need to be the same shared bandwidth for MU group 205-b. Other STAs (not shown) may exist in wireless communications subsystem 200 and may include additional MU-N and SU-only transmission groups.

AP 105-a may schedule a first transmission over wireless link 120-a or wireless link 120-b based at least in part on the transmit time metric determined for MU group 205-a and MU group 205-b. Scoring schemes may be applied by the AP 105-a to determine the group to receive the first transmission. For example, MU group 205-a may have a transmit time metric of 2.4 based at least in part on the transmit times of STAs in MU group 205-a, e.g., 8 ms for STA 115-a, 8 ms for STA 115-b, and 7 ms for STA 115-c. MU group 205-b may be determined to have a transmit time metric of 2.6 based at least in part on the transmit times of STAs in MU group 205-b, e.g., 6 ms for STA 115-d, 6 ms for STA 115-e, and 6 ms for STA 115-f. In some cases, the determined transmit time for each of the STAs is rounded up to a nearest transmission interval boundary (e.g., 2 ms interval increments), and the determined transmit time for each of STAs may be capped at particular time value (e.g., 8 ms). Additionally, the transmit time metric for each of MU group 205-a and MU group 205-b may include an overhead associated with the MU transmission (e.g., an MU sounding procedure transmission time). Thus, AP 105-a may determine to schedule the first transmission to MU group 205-a for at least the reason that it has a higher transmit time metric. The AP 105-a may check the number of available tokens for each of STAs 115-a, 115-b, 115-c of MU group 205-a to determine whether to allow the transmission, and if allowable, AP 105-a may transmit to MU group 205-a over wireless link 120-a. It is to be appreciated that in some implementations, a particular STA 115 can be permitted to receive a transmission even if the transmission may cause that particular STA 115 to result in a negative token value.

After the transmission to MU group 205-a, AP 105-a may reduce the number of available tokens for each of STAs 115-a, 115-b, 115-c by a particular amount based at least in part on the type of transmission. Because the transmission to MU group 205-a in the example above was an MU-3 transmission, the number of tokens reduced for each of STAs 115-a, 115-b, 115-c may be an amount (e.g., 2 tokens) that is less than an amount for an MU-2 transmission (e.g., 3 tokens) or an SU transmission (e.g., 6 tokens). The AP 105-b may then determine a subsequent transmission to one of the transmission group. The subsequent transmission can be to MU group 205-a (e.g., if the transmit time metric is again greater than that of MU group 205-b and sufficient tokens exist for each of STAs 115-a, 115-b, 115-c). However, the subsequent transmission may be to MU group 205-b or to another group (not shown) based at least in part on scoring and token management schemes described herein. Prior to the subsequent transmission, the AP 105-a may read another transmit queue snapshot (e.g., obtain an updated indication of the amount of data to be transmitted for each of the STAs). Alternatively, the AP 105-a may utilize the current transmit queue snapshot for the subsequent transmission (e.g., utilize the same transmit queue snapshot for 2, 3, up to n scheduled transmissions). Additionally, prior to the subsequent transmission, the AP 105-a may re-assign the transmission groups based at least in part on the same or comparable MCS index values and/or an amount of traffic as described herein. Alternatively, the AP 105-a may utilize the currently assigned groups for the subsequent transmission (e.g., utilize the same transmission groups for 2, 3, up to n scheduled transmissions).

Figure 3:
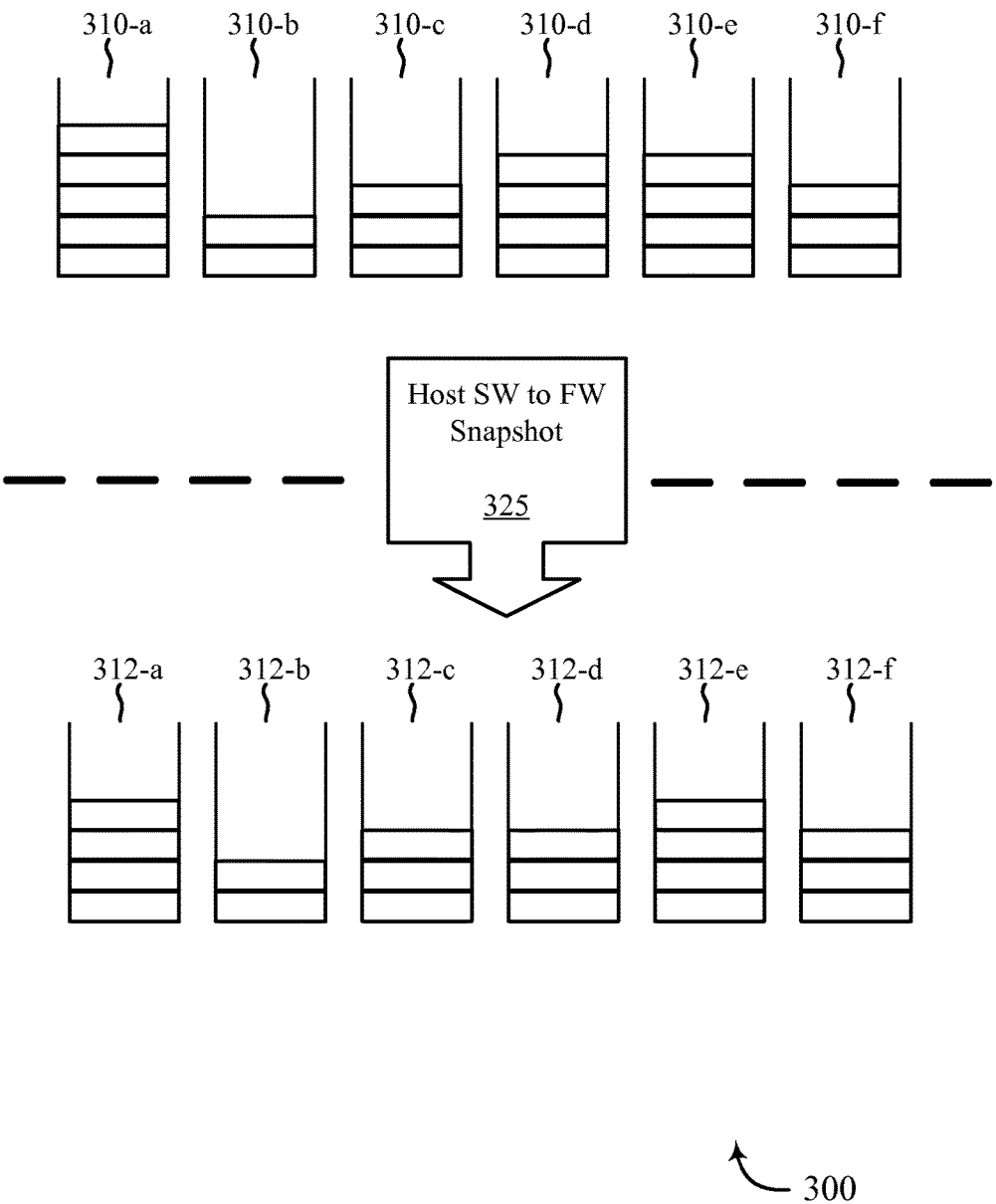
FIG. 3 conceptually illustrates an example of a host software-firmware queue architecture that supports MU-MIMO scheduling in accordance with various aspects of the present disclosure.

FIG. 3 conceptually illustrates an example of a snapshot of a host software (SW)-firmware queue architecture 300 and associated process for MU-MIMO scheduling in accordance with various aspects of the present disclosure. Host SW-firmware queue architecture 300 may relate to STAs 115-a, 115-b, 115-c, 115-d, 115-e, 115-f and AP 105-a, which may be examples of an STA 115 and an AP 105 described with reference to FIGS. 1-2.

Host SW-firmware queue architecture 300 may include per-STA (and per-transmission identifier (TID)) queues in both host SW and firmware. For example, host SW-firmware queue architecture 300 may include a plurality of host SW queues 310-a, 310-b, 310-c, 310-d, 310-e, and 310-f and a plurality of firmware queues 312-a, 312-b, 312-c, 312-d, 312-e, and 312-f. For exemplary purposes, host SW queue 310-a and firmware queue 312-a may relate to an amount of packets to be transmitted by AP 105-a to STA 115-a. Additionally, host SW queue 310-b and firmware queue 312-b may relate to an amount of packets to be transmitted by AP 105-a to STA 115-b; host SW queue 310-c and firmware queue 312-c may relate to an amount of packets to be transmitted by AP 105-a to STA 115-c; etc.

The host SW (e.g., SW for a host computer that may include two-way access to other computers on a network, for example, the Internet) may keep pointers to the information about frames to be transmitted by AP 105-a (e.g., sometimes referred to as descriptors). As firmware memory of AP 105-a (or another device) may be limited, the host SW may not pass all descriptors to incoming frames immediately to the firmware of AP 105-a. For example, STA 115-a may have five blocks of data in the host SW queue 310-a; however, only four blocks of data may be represented in the firmware queue 312-a. Similarly, STA 115-d may have four blocks of data in the host SW queue 310-d; however, only three blocks of data may be represented in the firmware queue 312-d. In this regard, firmware may explicitly request that host SW send information to firmware, along with the details and type of information requested.

Thus, the host SW may share with firmware a snapshot 325 of the current host SW queue depths for all STAs 115-a, 115-b, 115-c, 115-d, 115-e, 115-f at regular intervals, for example. A scheduler within firmware may determine when to start making preparations for a next scheduling command. The firmware scheduler may read the snapshot 325 of the host SW queue depth, which may indicate the amount of bytes (or other data measurement unit) stored in each of the transmit queues (e.g., per STA, TID, etc.). The firmware may combine the information in the host SW queues 310-a, 310-b, 310-c, 310-d, 310-e, 310-f with the scheduler control information and may start determine what the most efficient next transmission may be (e.g., MU-3, MU-2, SU). Alternatively or additionally, the firmware may combine the information in the firmware queues 312-a, 312-b, 312-c, 312-d, 312-e, 312-f with the scheduler control information and may start determine what the most efficient next transmission may be (e.g., MU-3, MU-2, SU). When an MU transmission is determined, firmware may start to determine which station combinations may result in higher medium utilizations.

A primary user or primary STA may be defined on which selection of other partner STAs for MU transmission may be based. For example, a primary STA may be determined as the STA with a highest transmit time metric. In other examples, a primary STA may be determined as the STA with a highest transmit time metric and a highest MCS index value. As such, transmissions (e.g., MU-N or SU) can be optimized when a state of each of the STAs along with pertinent data is available. For example, STAs with larger amounts of transmit time can be grouped together and the MU-MIMO transmission may be formed in such a way that the amount of padding or filler packets for the second and third STAs can be reduced (see, e.g., FIG. 9).

In some cases, data inflow to AP 105-a does not exceed a MU-MIMO transmission throughput limit. In such cases, the amount of pending transmit time stored in the host, and the related number of descriptors for media access control (MAC) service data unit (MSDU) that are outstanding, may be significantly less when utilizing techniques MU-MIMO scheduling techniques with host SW-firmware queue architecture 300 described herein as compared to round-robin transmission operations.

Figure 4:
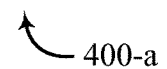
FIG. 4 illustrates examples of transmission candidate tables associated with MU-MIMO scheduling in accordance with various aspects of the present disclosure.
Figure 4:
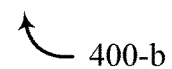

FIG. 4 illustrates examples of transmission candidate tables 400-a and 400-b associated with MU-MIMO scheduling in accordance with various aspects of the present disclosure. Transmission candidate tables 400-a and 400-b may relate to AP 105-a and various STAs, which may be examples of AP 105 and STA 115 described with reference to FIGS. 1-2. Reference to the examples described in FIG. 3 is made with respect to FIG. 4.

For each scheduling decision, the firmware of AP 105-a may provide an initial classification for each STA 115 based at least in part on a corresponding MCS index value. The firmware of AP 105-a may generate transmission candidate table 400-a as described herein. Entries associated with columns labeled MCS 9 though MCS 0 can be MU transmission entries and the column labeled SU ONLY are SU transmission entries.

For example, the firmware of AP 105-a may check whether each STA 115 is MU transmission eligible. In some examples, the firmware determines whether the STA 115 is configured for MU transmission capability (e.g., legacy equipment), whether the STA 115 has a sufficiently high MCS index value to support effective MU transmission, and/or whether the STA 115 exhibits Doppler Shift characteristics such that MU transmission may be ineffective.

With the initial MU transmission eligibility determined, the firmware of AP-105-a may calculate a transmit time metric for each STA 115 based at least in part on an amount of data and a MCS data rate. For example, the amount of bytes (or other data measurement unit) stored in a transmit queue for the STA 115 can be estimated from the corresponding firmware queue 312 via a snapshot 325 of the current host SW queue depth for that STA 115. The firmware may translate the amount of bytes for the STA 115 to a transmit time based at least in part on the corresponding MCS data rate. For MU transmission eligible STAs 115, an MU MCS data rate may be used. For SU transmission STAs 115, an SU data rate may be used.

If an STA 115 is eligible for a MU transmission, the STA is mapped to an MU entry based at least in part on the transmit time for the STA and the STA's MCS index value. In the example illustrated by transmission candidate table 400-a, there are ten STAs 115 (e.g., STAs A, B, C, D, E, F, G, H, I, J, K). Each of STAs A, B, C has a MCS index value of 9. STA A has more transmit time than STA B, and STA B has more transmit time than STA C. STA D has a MCS index value of 8, and STA E has a MCS index value of 7. Each of STAs F, G has a MCS index value of 6, and STA F has more transmit time than STA G. STA H has a MCS index value of has 5, and each of STAs I, J, K has been to be determined for SU transmission. In some implementations, an STA 115 is placed in an MU classification if that STA 115 is within the top (n) (e.g., top 3, top 4, top 5, etc.) transmit times among all MU candidates. Similarly, in some implementations, an STA 115 is placed in the SU ONLY classification if that STA 115 is within the top (n) (e.g., top 3, top 4, top 5, etc.) transmit times among all SU-only transmissions. In accordance with some aspects, entries with a lower MCS index value (e.g., less than a certain percentage of the relevant possible MCS index values) are determined to be optimized as entries for SU-only transmissions.

In another example of FIG. 4, transmission candidate table 400-b includes ten STAs 115 (e.g., STAs A, B, C, D, E, F, G, H, I, J, K). These ten STAs 115 can correlate to the ten STAs 115 from transmission candidate table 400-a, for example, with improved OTA transmission conditions at a different time. Transmission candidate table 400-b also illustrates an implementation where adjacent MCS index values are utilized as MU classification. For example, each of STAs A, B, C has a MCS index value of 9 or 8 (e.g., corresponding to MCS index values having a modulation type of 256-QAM). In this regard, MCS index values (or like classification schemes) may be grouped according to those MCS index values having the same modulation type, but with different coding rates and/or number of spatial schemes. STA A has more transmit time than STA B, and STA B has more transmit time than STA C. Each of STAs D, E, F, G has a MCS index value of 8 or 7. STA D has more transmit time than STA E, STA E has more transmit time than STA F, and STA F has more transmit time than STA G. Each of STAs H, I, J, K has a MCS index value of 6 or 5. STA H has more transmit time than STA I, STA I has more transmit time than STA J, and STA J has more transmit time than STA K.

With reference to the transmission candidate table 400-b of FIG. 4, a scoring and scheduling scheme may include calculating a transmit time metric corresponding to MAC efficiency for the STAs in a particular MU classification (e.g., a candidate transmission group). For example, scoring and scheduling scheme may include capping the transmit time for each STA 115 to a maximum time value (e.g., 8 ms in some implementations). The transmit time metric may be calculated by summing the transmit time of each STA 115 in a candidate transmission group, dividing that summation by the maximum transmit time of the each of the STAs 115 in the candidate transmission group plus an overhead associated with the transmission (e.g., $$\text{transmit time metric} = \frac{(STAA_{TxTime} + STAB_{TxTime} + STAC_{TxTime})}{\max(STAA_{TxTime}, STAB_{TxTime}, STAC_{TxTime}) + \text{overhead}}$$

for three STAs 115). The overhead may be estimated based in part on previous overhead associated with the MU transmission (e.g., an MU sounding procedure transmission time) performed under similar conditions (e.g., number of STAs 115 and MCS index value). In this regard, a different overhead value is used based at least in part on the amount of sounding and block acknowledgement requests (BAR) and block acknowledgement (BA) exchanges.

For each of the candidate transmission groups in an MU classification with (N) entries of STAs 115, (N) transmit time metrics may be calculated. For example, (N) transmit time metrics calculations include MU-N, ..., MU-3, MU-2, and SU. In some implementations, the number of entries of STAs 115 in a candidate transmission group is limited to three to reduce computational requirements and increase the likelihood of MU transmission effectiveness. For example, if the entries in MCS 9/8 MU classification has STA A, STA B, and STA C as shown in transmission candidate table 400-b, and STA A has a transmit time=12 ms, STA B has transmit time=8 ms, and STA C has transmit time=7 ms. MU-3 overhead may be estimated at 1.4 ms, and therefore the MU-3 transmit time metric=(8+8+7)/(8+1.5)=2.4. MU-2 overhead may be estimated at 1.1 ms, and therefore the MU-2 transmit time metric=(8+8)/(8+1.1)=1.8. The SU overhead may be estimated at 0.1 ms, and therefore the SU transmit time metric= (8)/(8+0.1)=0.9.

The MU-3, MU-2 and SU calculations may be performed for the entries in each MCS MU classification of a transmission candidate table, for example, transmission candidate table 400-b. The one of the MU-3, MU-2 and SU with the highest transit time metric may be selected for transmission. The selected one becomes the transmission group proposal for that particular MCS MU classification in accordance with some embodiments.

Each MCS MU classification of a transmission candidate table column may hold six or more STA 115 candidate entries. An optimized set of STAs 115 that can be combined may be determined based at least in part on the calculated MU-3 and MU-2 transmit time metrics. As multiple transmission group candidates are possible, several iterations may be performed to determine a combination of STAs 115 that result in the best or optimized values. As noted above, STAs are checked for compatibility with respect to MU transmission capability (e.g., compatible STAs may share the same bandwidth or other features or attributes). With the six or more STAs 115 having already been ordered from most transmit time to least transmit time, and the search or calculation for STA 115 combinations for MU transmission groups starting with the largest transmit time, the number of actual iterations for calculating transmit time metrics for the STA 115 combinations can be limited in some embodiments.

In some cases, calculations for all STAs 115 need not be performed. For example, if an MU-3 candidate transmission group is found with all three STAs 115 having 8 ms or more of transmit time, further transmit time metric calculations (e.g., MU-2 and SU transmit time metric calculations) for that candidate transmission group need not be performed. Additionally, if one SU-only STA 115 has greater than 8 ms of transmit time and has sufficient tokens, that SU-only STA 115 can be scheduled for a next or subsequent transmission opportunity.

Figure 5:
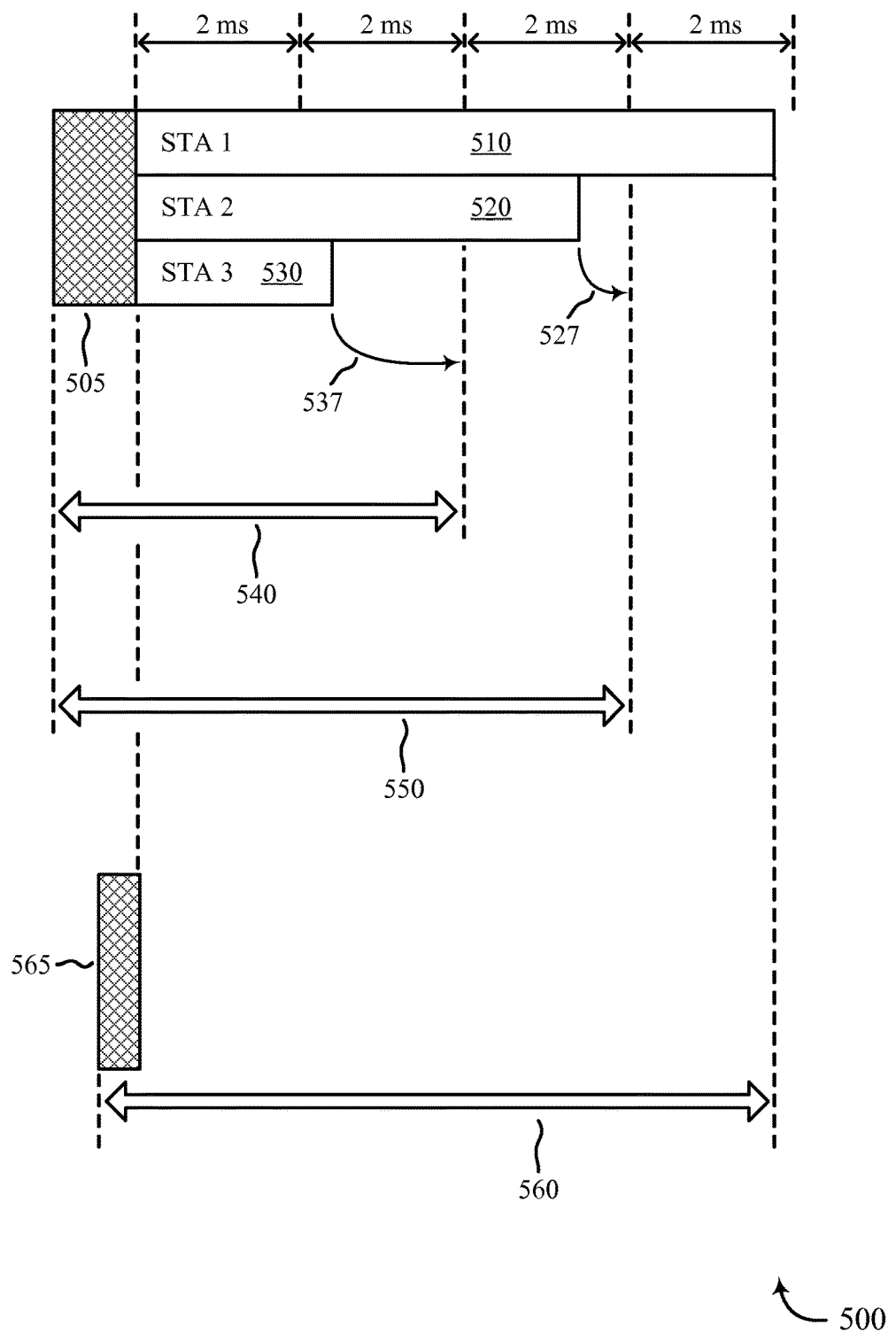
FIG. 5 illustrates an example of MU-3, MU-2, and single user (SU) transmission blocks associated with MU-MIMO scheduling in accordance with various aspects of the present disclosure.

FIG. 5 illustrates an example of MU-3, MU-2, and SU transmission blocks 500 associated with MU-MIMO scheduling in accordance with various aspects of the present disclosure. The transmission blocks 500 may be transmitted by an AP 105, which may be an example of an AP 105 described with reference to FIGS. 1-2. Reference to the examples described in FIG. 4 is made with respect to FIG. 5.

The transmission blocks 500 of FIG. 5 illustrate how transmission blocks can be defined corresponding to MU-3, MU-2, and SU transmit time metrics described herein with respect to FIG. 4. For an MU-3 transmission block 540, the shortest transmit time of the STA 1 510, STA 2 520, and STA 3 530 may be rounded up to the next or nearest 2 ms boundary. Thus, STA 3 530 may be rounded up (arrow 537) to the next or nearest 2 ms boundary. This boundary can determine the final MU-3 transmission duration (e.g., 4 ms). The MU-3 transmission block 540 also includes MU transmission overhead 505, in certain embodiments.

For an MU-2 transmission block 550, the shortest transmit time of the two largest transmit times of STA 1 510, STA 2 520, and STA 3 530 may be rounded up to the next or nearest 2 ms boundary. Thus, STA 2 520 may be rounded up (arrow 527) to the next or nearest 2 ms boundary. This boundary can determine the final MU-2 transmission duration (e.g., 6 ms). The MU-2 transmission block 550 also includes MU transmission overhead 505.

For the SU transmission block 560, the transmit time for the largest transmit time of STA 1 510, STA 2 520, and STA 3 530 is determined. Rounding to a next or nearest 2 ms boundary for an SU transmission is not necessary in some examples. The SU transmission block 560 also includes SU transmission overhead 565, which may be less that an MU transmission overhead 505.

Figure 6:
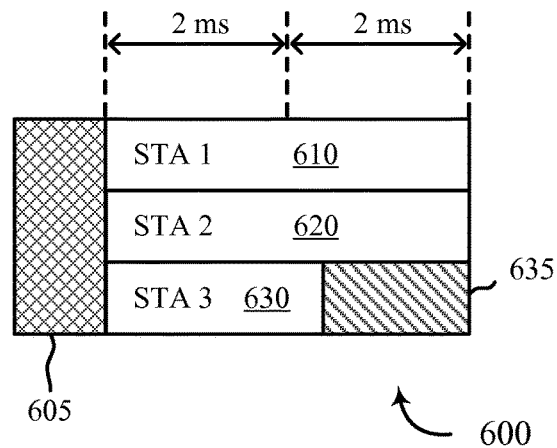
FIG. 6 illustrates an example of an MU-3 transmission block associated with MU-MIMO scheduling in accordance with various aspects of the present disclosure.

FIG. 6 illustrates an example of an MU-3 transmission block 600 associated with MU-MIMO scheduling in accordance with various aspects of the present disclosure. MU-3 transmission block 600 may be transmitted by an AP 105, which may be an example of an AP 105 described with reference to FIGS. 1-2. MU-3 transmission block 600 relates to the corresponding example of the MU-3 transmission block 540 described in FIG. 5.

MU-3 transmission block 600 may include 4 ms of transmit time for STA 1 610, 4 ms of transmit time for STA 2 620, and less than 4 ms of transmit time for STA 3 630. MU-3 transmission block 600 may also include padding or filler packets 635 of less than 2 ms to complete the 4 ms transmission duration for STA 3 630. MU-3 transmission block 600 may also include MU transmission overhead 605.

Figure 7:
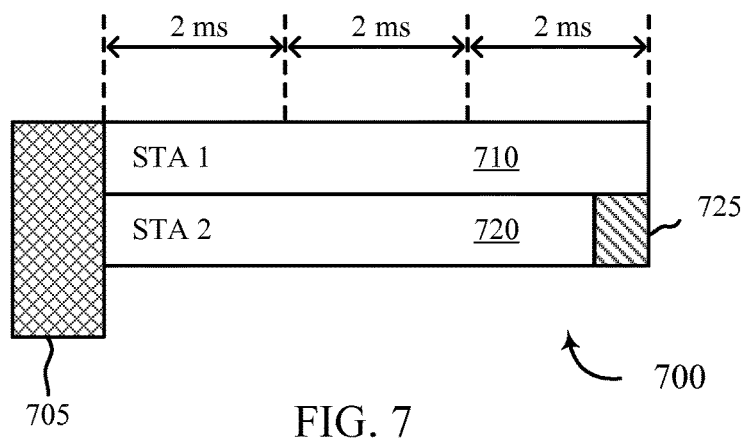
FIG. 7 illustrates an example of an MU-2 transmission block associated with MU-MIMO scheduling in accordance with various aspects of the present disclosure.

FIG. 7 illustrates an example of an MU-2 transmission block 700 associated with MU-MIMO scheduling in accordance with various aspects of the present disclosure. MU-2 transmission block 700 may be transmitted by an AP 105, which may be an example of an AP 105 described with reference to FIGS. 1-2. MU-2 transmission block 700 relates to the corresponding example of the MU-2 transmission block 550 described in FIG. 5.

MU-2 transmission block 700 may include 6 ms of transmit time for STA 1 710, and less than 6 ms of transmit time for STA 720. MU-2 transmission block 700 may also include padding or filler packets 725 of less than 2 ms to complete the 6 ms transmission duration for STA 2 720. MU-2 transmission block 700 may also include MU transmission overhead 705. As compared to the example of MU-3 transmission block 600 in FIG. 6, MU-2 transmission block 700 may be a more efficient transmission as MU-2 transmission block 700 has less padding to complete the 12 ms total transmit time than MU-3 transmission block 600, and may have slightly less MU transmission overhead.

Figure 8:
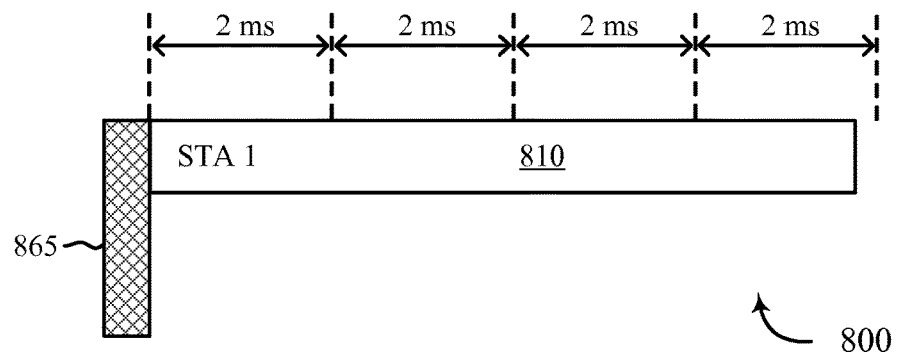
FIG. 8 illustrates an example of an SU transmission block associated with MU-MIMO scheduling in accordance with various aspects of the present disclosure.

FIG. 8 illustrates an example of an SU transmission block 800 associated with MU-MIMO scheduling in accordance with various aspects of the present disclosure. SU transmission block 800 may be transmitted by an AP 105, which may be an example of an AP 105 described with reference to FIGS. 1-2. SU transmission block 800 relates to the corresponding example of the SU transmission block 560 described in FIG. 5.

SU transmission block 800 may include less than 8 ms of transmit time for STA 1 810 (e.g., an entirety of the amount of data in the corresponding transmit queue for STA 1 810). SU transmission block 800 may not require padding or filler packets of less than 2 ms in some embodiments. However, in other embodiments, padding or filler packets may be included to complete the 8 ms transmission duration (or up to the next or nearest 2 ms transmission interval) for transmission of the SU transmission block 800. SU transmission block 800 also includes SU transmission overhead 865, which may be less that an MU transmission overhead. However, as compared to the examples of MU-3 transmission block 600 in FIG. 6 and MU2 transmission block 700 in FIG. 7, SU transmission block 800 may be a less efficient transmission as it has less total transmit time (e.g., a total transmit time of less than 8 ms).

Figure 9:
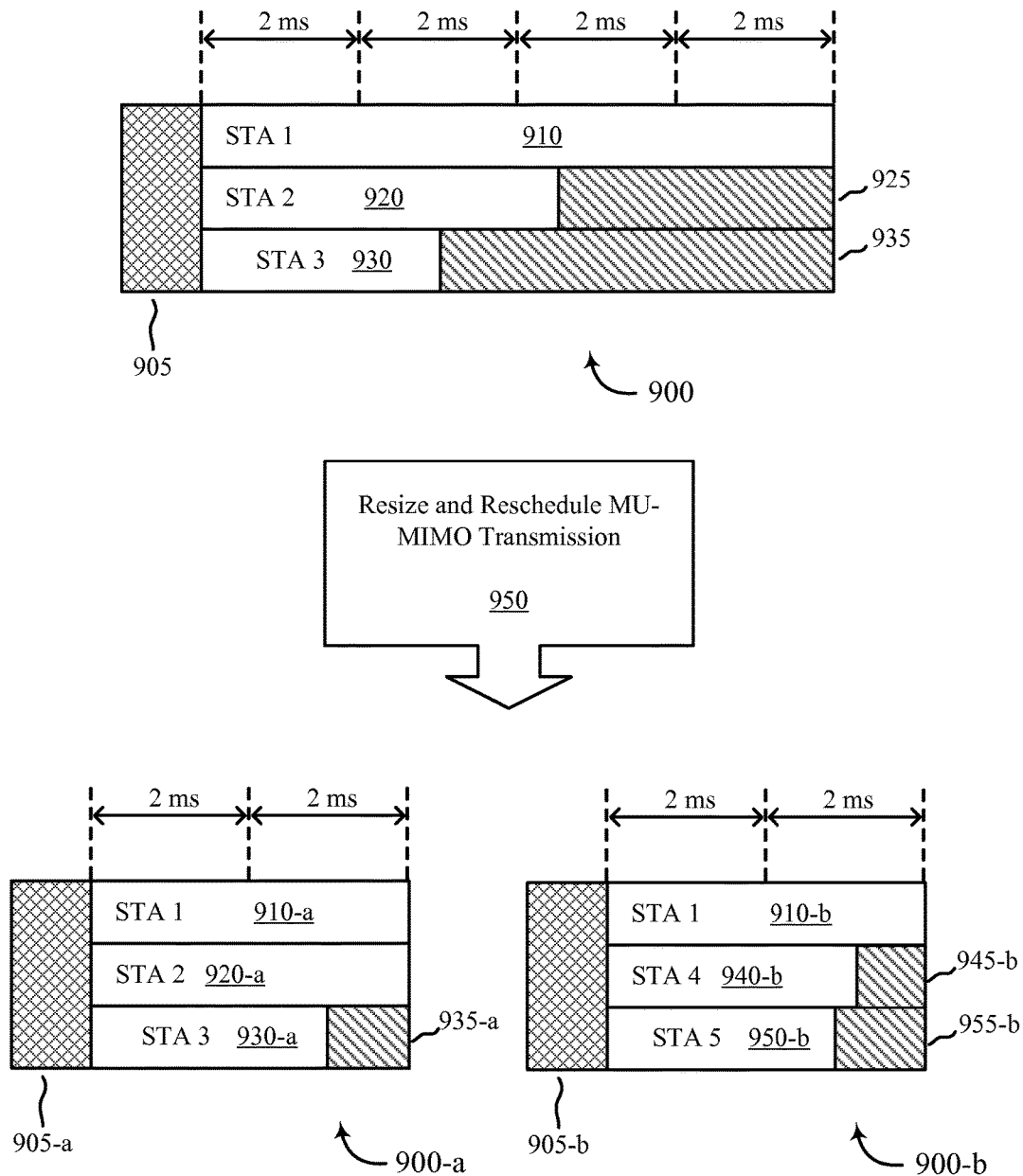
FIG. 9 illustrates an example of splitting an MU-3 transmission block into two smaller MU-3 transmission blocks associated with MU-MIMO scheduling in accordance with various aspects of the present disclosure.

FIG. 9 illustrates an example of splitting an MU-3 transmission block 900 into two smaller MU-3 transmission blocks 900-*a* and 900-*b* associated with MU-MIMO scheduling in accordance with various aspects of the present disclosure. MU-3 transmission blocks 900, 900-*a*, 900-*b* may be transmitted by an AP 105, which may be an example of an AP 105 described with reference to FIGS. 1-2.

MU-3 transmission block 900 may include 8 ms of transmit time for STA 1 910, less than 6 ms of transmit time for STA 2 920, and less than 4 ms of transmit time for STA 3 930. MU-3 transmission block 900 may also include padding or filler packets 925 of less than 4 ms to complete the 8 ms transmission duration for STA 2 920, and padding or filler packets 935 of less than 6 ms to complete the 8 ms transmission duration for STA 3 930. MU-3 transmission block 900 may also include MU transmission overhead 905. In this regard, STA 1 910 may have a significantly larger transmit time than the other potential partner STAs (e.g., STA 2 920, STA 3 930, STA 4 940, STA 5 950).

MU-3 transmission block 900 may be scheduled for transmission, for example, if MU-3 transmission block 900 includes an entirety of the queued traffic for the AP 105. Alternatively, MU-3 transmission block 900 may be transmitted as multiple MU-2 transmission blocks using the scoring and scheduling techniques described herein. However, as illustrated with respect to MU-3 transmission block 900, padding and filler packet usage or portion of the total transmit time could actually be sufficiently large that, in some cases, the MU-3 transmission block 900 will be resized and rescheduled 950 by AP 105 with shorter the MU-MIMO transmissions.

For example, MU-3 transmission block 900 may be shortened into MU-3 transmission block 900-*a* and MU-3 transmission block 900-*b* for better transmission efficiency. MU-3 transmission block 900-*a* may include 4 ms of transmit time for STA 1 910-*a*, 4 ms of transmit time for STA 2 920-*a*, and less than 4 ms of transmit time for STA 3 930-*a*. MU-3 transmission block 900-*a* may also include padding or filler packets 935-*a* of less than 2 ms to complete the 4 ms transmission duration for STA 3 930-*a*. MU-3 transmission block 900-*a* may also include MU transmission overhead 905-*a*.

The remainder or additional transmit time from STA 1 910 may be provided in MU-3 transmission block 900-*b* along with transmit time associated with for other stations. For example, MU-3 transmission block 900-*b* may include 4 ms of transmit time for STA 1 910-*b*, less than 4 ms of transmit time for STA 4 940-*b*, and less than 4 ms of transmit time for STA 5 950-*b*. MU-3 transmission block 900-*b* may also include padding or filler packets 945-*b* of less than 2 ms to complete the 4 ms transmission duration for STA 4 940-*b*, and padding or filler packets 955-*b* of less than 2 ms to complete the 4 ms transmission duration for STA 5 950-*b*. MU-3 transmission block 900-*b* may also include MU transmission overhead 905-*b*.

Thus, the scoring and scheduling schemes described herein provide various options for optimizing and scheduling MU-MIMO transmissions. In accordance with some aspects, STAs with the most transmit time are selected for MU-MIMO transmission. As such, by the time the MU-MIMO transmission of large transmit time STAs has completed, other STAs that still have transmit tokens remaining may have received more data and can be partnered with other largest transmit time STAs. Thus, MU-MIMO transmission optimization may include keeping the overhead usage-to-useful transmit time ratio relatively small. Additionally, managing the transmit tokens in accordance with proportionality guidelines may ensure that the overall or aggregate transmit opportunities are provided in an approximate even manner between the STAs such that scheduling latencies can remain within acceptable limits.

Figure 10:
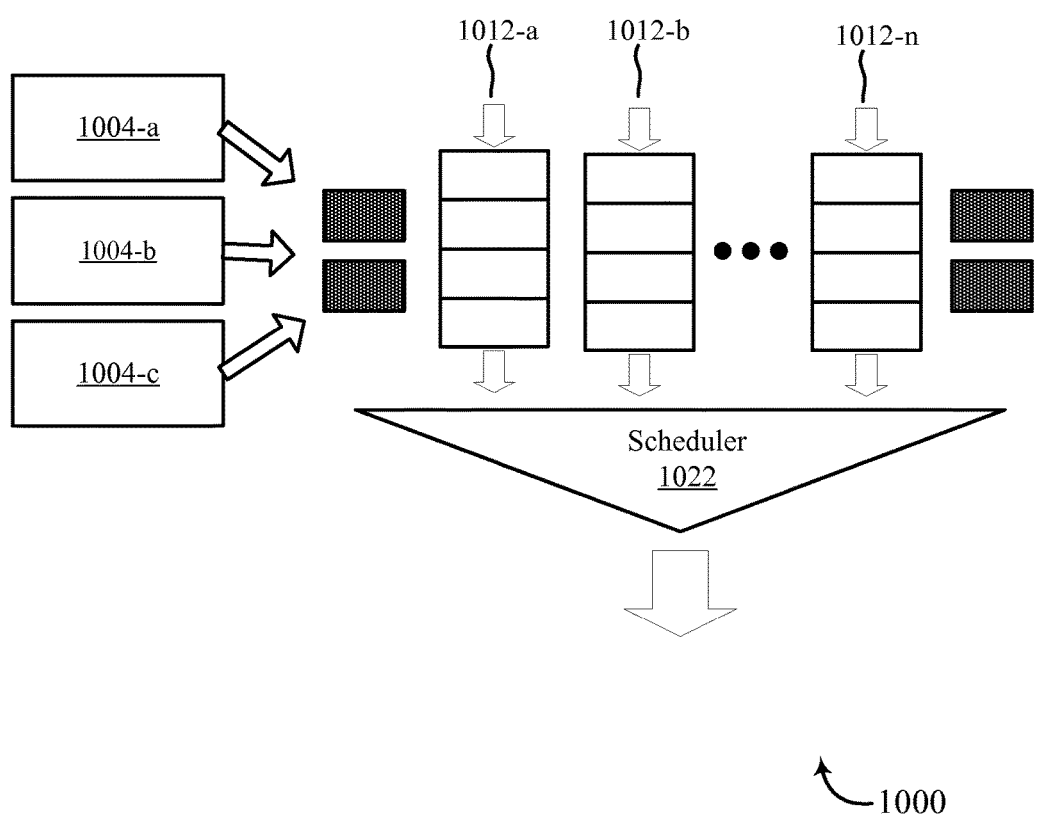
FIG. 10 conceptually illustrates an example of a token management system that supports MU-MIMO scheduling in accordance with various aspects of the present disclosure.

FIG. 10 conceptually illustrates an example of a token management system 1000 that supports MU-MIMO scheduling in accordance with various aspects of the present disclosure. Token management system 1000 may be included in AP 105, which may be an example AP 105 described with reference to FIGS. 1-2. Token management system 1000 relates to various STAs, which may be examples of STA 115, and STAs 115-a, 115-b, 115-c, 115-d, 115-e, 115-f described with reference to FIGS. 1-2.

AP 105 may include an interface to one or more of scheduling algorithms 1004-a, 1004-b, and 1004-c. The scheduling algorithms 1004-a, 1004-b, and 1004-c may determine how many tokens should be allocated to each transmit queue 1012-a, 1012-b, and 1012-n associated with a corresponding STA. The scheduling algorithms 1004-a, 1004-b, and 1004-c may allocate one token for each transmit queue 1012-a, 1012-b, and 1012-n per round-robin interval, for example, when the AP 105 determines that transmit traffic is distributed uniformly between all STAs.

In some examples, the scheduling algorithms 1004-a, 1004-b, and 1004-c allocates a token bucket to each transmit queue 1012-a, 1012-b, and 1012-n associated with a corresponding STA. For example, at the beginning of each token round, one or more of the scheduling algorithms 1004-a, 1004-b, and 1004-c may assign a predefined number of tokens (e.g., 6 tokens, 12 tokens, or 18 tokens) to each STA. In this regard, the predefined number of tokens may be a multiple of 2(N), where (N) relates to the largest MU-N transmission group. For example, if AP 105 is configured for MU-3, MU-2, and SU transmissions, the predefined number of tokens at the beginning of each token round may be a multiple of six (i.e., 6 tokens, 12 tokens, 18 tokens, or 24 tokens, etc.). Similarly, if AP 105 is configured for MU-4, MU-3, MU-2, and SU transmissions, the predefined number of tokens at the beginning of each token round may be a multiple of eight (i.e., 8 tokens, 16 tokens, 24 tokens, or 32 tokens, etc.). A lower number of tokens at the beginning of each token round may result in lower latency associated with transmissions to all STAs (e.g., only 6 tokens assigned to each STA at the beginning of each token round). A higher number of tokens at the beginning of each token round may result in higher overall throughput associated with transmissions to all STAs (e.g., 12 tokens or 18 tokens assigned to each STA at the beginning of each token round). Additionally, in some implementations, each STA may have start with a different number of tokens at the beginning of each token round based at least in part on a status of the STA and/or a type of data associate with the STA. For example, a preferred STA (e.g., a STA associated with user or service having a preferred/higher quality of service (QoS) tier or a mission critical/emergency services tier) starts with 18 tokens whereas a standard STA starts with 6 tokens at the beginning of each token round in some implementations.

Before scheduling a transmission, a scheduler 1022 of the AP 105 may check a token count to determine which STAs may be the subject of a transmit time metric calculation and upcoming transmission. In some embodiments, if the STA has at least one token, the STA is considered in the upcoming transmission. The scheduler 1022 and/or the scheduling algorithms 1004-a, 1004-b, and 1004-c may assess a token cost for each STA associated with the subsequent transmission. For example, AP 105 is configured for MU-3, MU-2, and SU transmissions in some implementations. If the transmission is an SU-only transmission, the token cost may be six tokens and the token count for the STA receiving the SU-only transmission may decrease by six tokens. If the transmission is an MU-2 transmission, the token cost may be three tokens and the token count for each of the two STAs receiving the MU-2 transmission may decrease by three tokens. If the transmission is an MU-3 transmission, the token cost may only be two tokens and the token count for each of the three STAs receiving the MU-3 transmission may decrease by two tokens. In this regard, the decrement of tokens or token cost is based at least in part on efficiency or throughput of the associated transmission (e.g., the greater the efficiency of the transmission, the lower the token cost to the STA(s) associated with that transmission).

In some embodiments, the scheduler 1022 and/or one or more of the scheduling algorithms 1004-a, 1004-b, and 1004-c can allow a particular STA to end up with a negative amount of tokens after a subsequent transmission (e.g., the worst case being one token fewer than the token cost associated with an SU-only transmission). In other embodiments, no token deficit is permitted. A token round in some examples is finished when each STA considered for transmission either has no data or no tokens available for a certain timeframe. As such, the scheduler 1022 and/or the scheduling algorithms 1004-a, 1004-b, and 1004-c may add additional tokens (e.g., 6 tokens, 12 tokens, or 18 tokens) with some ceiling resulting in unequal amount of tokens among STAs at the beginning of the next token round in some cases. Alternatively, the number of tokens may be replenished to the amount at the start of the token round (e.g., each STA begins again with six tokens at the beginning of the next token round).

Table 1 below provides a token management example incorporating portions of the token management aspects described herein.

TABLE 1

| Transmission Opportunity | STA A | STA B | STA C | STA D |
|---|---|---|---|---|
| Beginning token count: | 6 | 6 | 6 | 6 |
| Tx 1: MU-3 STAs A, B, C | 4 | 4 | 4 | 6 |
| Tx 2: SU-only STA D | 4 | 4 | 4 | 0 |
| Tx 3: MU-2 STAs B, C | 4 | 1 | 1 | 0 |
| Tx 4: MU-2 STAs A, B | 1 | −2 | 1 | 0 |
| Replenish token count: No data for STAs A, C; no tokens available for STAs B, D | 6 | 6 | 6 | 6 |

As shown in Table 1, four STAs (i.e., STA A, STA B, STA C, and STA D) are provided tokens at the start of a token round. MU-MIMO scoring and scheduling techniques described herein may be used to determine a first transmission associated with the first transmission opportunity. For example, AP 105 may determine that an MU-3 transmission to STA A, STA B, and STA C is an optimized transmission. Accordingly, a token cost of two tokens is assessed to each of STA A, STA B, and STA C. At the next (second) transmission opportunity, AP 105 may determine that an SU-only transmission to STA D is an optimized transmission. Accordingly, a token cost of six tokens is assessed to STA D. At the next (third) transmission opportunity, AP 105 may determine that an MU-2 transmission to STA B and STA C is an optimized transmission. Accordingly, a token cost of three tokens is assessed to each of STA B and STA C. At the next (fourth) transmission opportunity, AP 105 may determine that an MU-2 transmission to STA A and STA B is an optimized transmission. Although an MU-2 transmission will cost three tokens for each STA in the transmission group, AP 105 may permit STA B to participate in the fourth transmission opportunity because STA B has at least one token remaining (e.g., 1 token in this example) at the beginning of the transmission opportunity. Accordingly, a token cost of three tokens is assessed to each of STA A and STA B.

After the fourth transmission in this example, STA A has one token remaining, STA B has a negative two token deficit, STA C has one token remaining, and STA D does not have any tokens remaining. If, for example, no data is in the transmit queues of STA A and STA C prior to the start of the next transmission opportunity, AP 105 will determine that the token round has ended because even if data exists in either one of the transmit queues of STA B or STA D, STA B and STA D do not have any tokens to participate in the next transmission opportunity. Therefore, AP 105 will replenish each of STA A, STA B, STA C, and STA D to the beginning token count of six tokens in the example shown in Table 1.

It is to be appreciated that the token management system, scoring and scheduling schemes, and other aspects of the disclosure described herein may be applied in other communication medium contexts.

In accordance with certain aspects of the disclosure, MU-MIMO scheduling is performed by AP 105, which may be an example AP 105 described with reference to FIGS. 1-2, and may include aspects in the examples described with reference to FIGS. 1-10 and Table 1. In accordance with other aspects of the disclosure, MU-MIMO scheduling is performed by a communication device (e.g., an STA 115 in a peer-to-peer configuration, which may include aspects of an example AP 105 and an example STA 115 described with reference to FIGS. 1-2). The communication device may include aspects in the examples described with reference to FIGS. 1-10 and Table 1.

Figure 11:
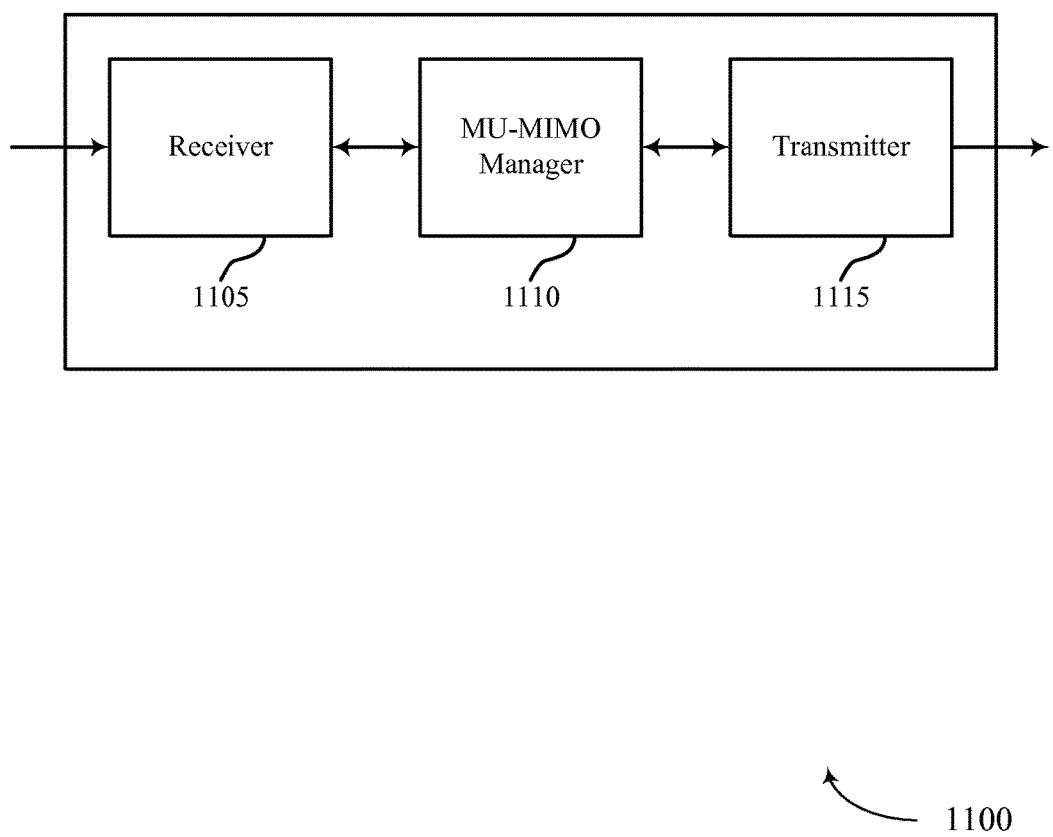
FIGS. 11-13 show block diagrams of a wireless device that supports MU-MIMO scheduling in accordance with various aspects of the present disclosure.

FIG. 11 shows a block diagram of a wireless device 1100 configured for MU-MIMO scheduling in accordance with various aspects of the present disclosure. Wireless device 1100 may be an example of aspects of an AP 105 described with reference to FIGS. 1-10. Wireless device 1100 may include a receiver 1105, a MU-MIMO manager 1110, or a transmitter 1115. Wireless device 1100 may also include a processor. Each of these components may be in communication with each other.

The receiver 1105 may receive information such as packets, user data, or control information associated with various information channels (e.g., control channels, data channels, and information related to MU-MIMO scheduling, etc.). Information may be passed on to the MU-MIMO manager 1110, and to other components of wireless device 1100.

The MU-MIMO manager 1110 may assign each of a plurality of wireless communication devices to a plurality of transmission groups based at least in part on a MCS for each of the plurality of wireless communication devices, determine a transmit time metric associated with each transmission group of the plurality of transmission groups based at least in part on an amount of data in a transmit queue and a MCS data rate for at least one wireless communication device in the transmission group, and schedule a transmission to a first transmission group of the plurality of transmission groups based at least in part on the transmit time metric for the first transmission group.

The transmitter 1115 may transmit signals received from other components of wireless device 1100. In some examples, the transmitter 1115 is collocated with the receiver 1105 in a transceiver. The transmitter 1115 includes one or multiple antennas.

Figure 12:
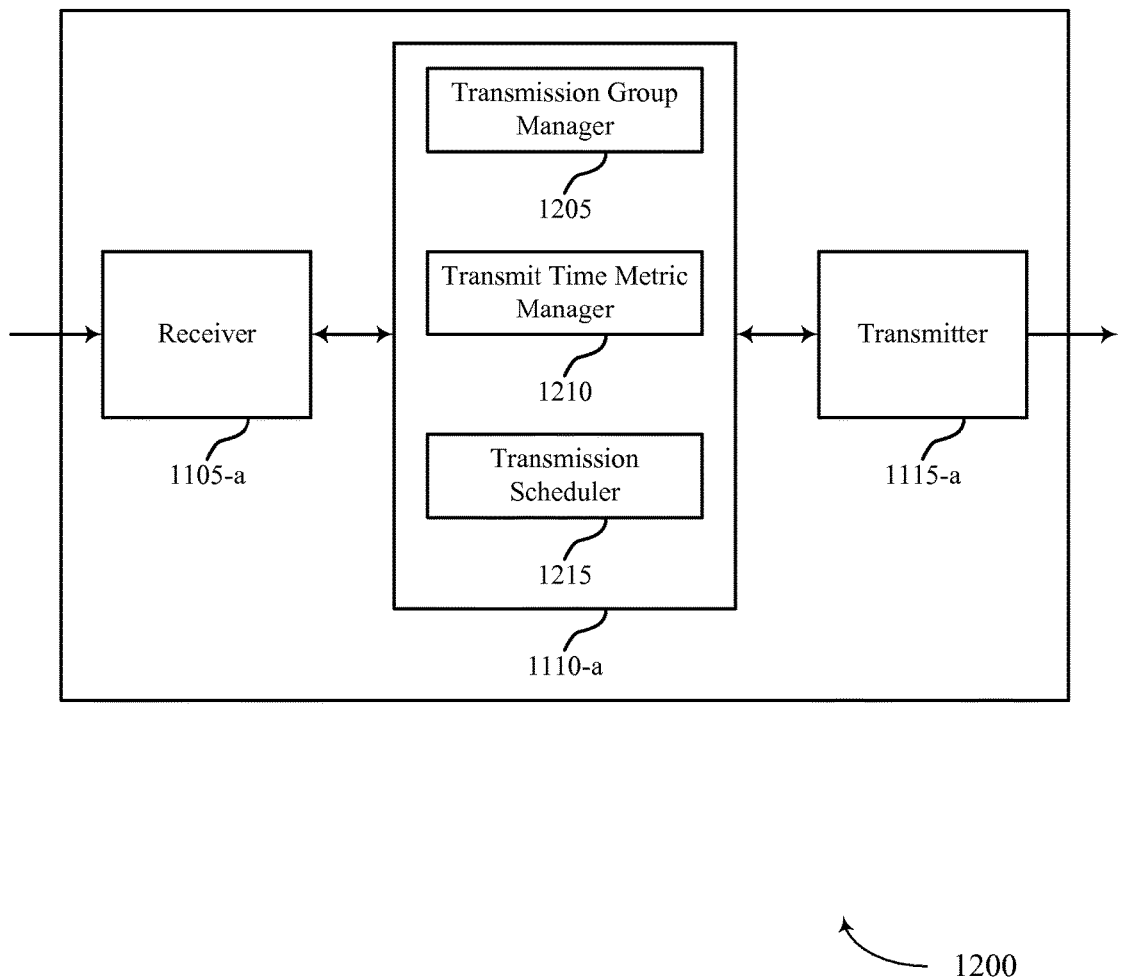

FIG. 12 shows a block diagram of a wireless device 1200 for MU-MIMO scheduling in accordance with various aspects of the present disclosure. Wireless device 1200 may be an example of aspects of a wireless device 1100 or an AP 105 described with reference to FIGS. 1-11. Wireless device 1200 may include a receiver 1105-*a*, a MU-MIMO manager 1110-*a*, or a transmitter 1115-*a*. Wireless device 1200 may also include a processor. Each of these components may be in communication with each other. The MU-MIMO manager 1110-*a* may also include a transmission group manager 1205, a transmit time metric manager 1210, and a transmission scheduler 1215.

The receiver 1105-*a* may receive information which may be passed on to MU-MIMO manager 1110-*a*, and to other components of wireless device 1200. The MU-MIMO manager 1110-*a* may perform the operations described with reference to FIG. 11. The transmitter 1115-*a* may transmit signals received from other components of wireless device 1200.

The transmission group manager 1205 may assign each of a plurality of wireless communication devices to a plurality of transmission groups based at least in part on a MCS for each of the plurality of wireless communication devices as described with reference to FIGS. 2-10. The transmission group manager 1205 may also assign the plurality of wireless communication devices based at least in part on the amount of data in the transmit queue in each of the plurality of wireless communication devices. The transmission group manager 1205 may also determine that at least two wireless communication devices of the plurality of wireless communication devices are compatible for a multi-user transmission based at least in part on a shared bandwidth between the at least two wireless communication devices.

The transmit time metric manager 1210 may determine a transmit time metric associated with each transmission group of the plurality of transmission groups based at least in part on an amount of data in a transmit queue and a MCS data rate for at least one wireless communication device in the transmission group as described with reference to FIGS. 2-10. The transmit time metric manager 1210 may also determine the transmit time metric by calculating a transmit time for the at least one wireless communication device from the amount of data in the transmit queue and the MCS data rate for the at least one wireless communication device. The transmit time metric manager 1210 may also cap the transmit time at a maximum time value. The transmit time metric manager 1210 may also determine the transmit time metric by calculating a transmit time for the at least one wireless communication device from the amount of data in the transmit queue and the MCS data rate for the at least one wireless communication device. The transmit time metric manager 1210 may also round the transmit time up to a nearest time interval boundary. The transmit time metric manager 1210 may also determine the transmit time metric for each of the plurality of transmission groups based at least in part on an overhead associated with the first transmission group. In some examples, the overhead associated with the first transmission group is based at least in part on a multi-user sounding procedure transmission time.

The transmission scheduler 1215 may schedule a transmission to a transmission group of the plurality of transmission groups based at least in part on the transmit time metric for the transmission group as described with reference to FIGS. 2-10.

Figure 13:
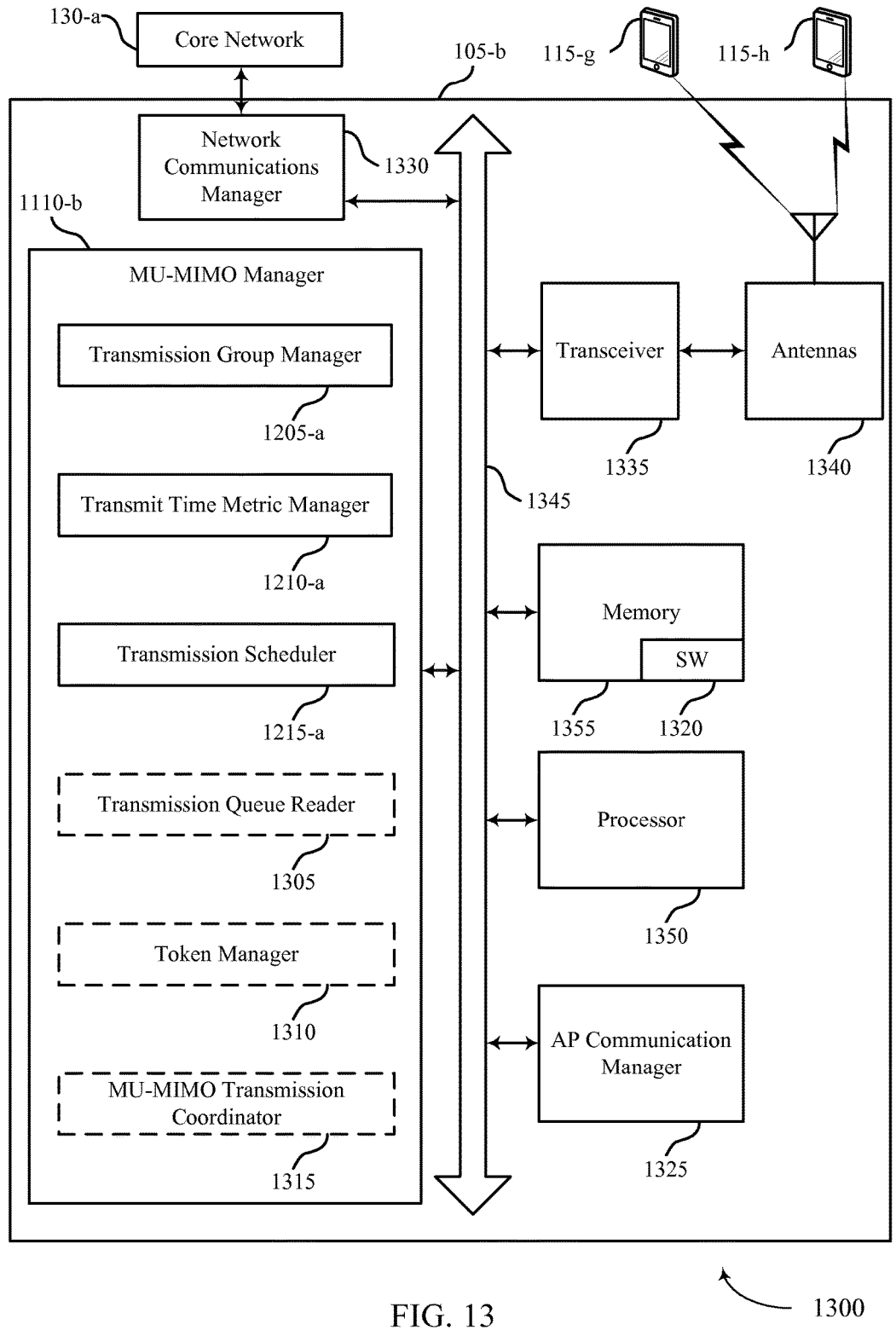

FIG. 13 shows a diagram of a system 1300 including an AP 105-*b* configured for MU-MIMO scheduling in accordance with various aspects of the present disclosure. AP 105-*b* may be an example of a wireless device 1100, a wireless device 1200, or an AP 105 described with reference to FIGS. 1, 2 and 11-12. AP 105-*b* may include a MU-MIMO manager 1110-*b*, which may be an example of a MU-MIMO manager 1110 described with reference to FIGS. 11-12. The MU-MIMO manager 1110-*b* may include a transmission group manager 1205-*a*, a transmit time metric manager 1210-*a*, and a transmission scheduler 1215-*a*. Each of these components may perform the features described with reference to FIG. 12. The MU-MIMO manager 1110-*b* may also include a transmission queue reader 1305, a token manager 1310, and a MU-MIMO transmission coordinator 1315. AP 105-*b* may also include components for bi-directional voice and data communications including components for transmitting communications and components for receiving communications. For example, AP 105-*b* may communicate bi-directionally with STA 115-*g* or STA 115-*h*. The AP 105-*b* may also communicate with a core network 130-*a* through network communications manager 1330. The AP 105-*b* may communicate with other APs using an APs communications manager 1325.

The transmission queue reader 1305 may read a transmit queue snapshot to determine the amount of data in the transmit queue for each of the plurality of wireless communication devices as described with reference to FIGS. 2-10, and in particular as described with reference to FIG. 3.

The token manager 1310 may schedule the transmission to the first transmission group further comprises checking a number of available tokens for each wireless communication device of a transmission group to determine whether to allow the transmission as described with reference to FIGS. 2-10, and in particular as described with reference to FIG. 10. The token manager 1310 may also reduce the number of available tokens for each wireless communication device of the transmission group to determine whether to allow the transmission. The token cost may be based at least in part on a type of the transmission associated with the transmission group.

The MU-MIMO transmission coordinator 1315 may coordinate the transmission of the transmission group as described with reference to FIGS. 2-10. For example, the MU-MIMO transmission coordinator 1315 may provide the transmission to the first transmission group. That is, the MU-MIMO transmission coordinator 1315 may provide correlated transmission methods such as beamforming with respect to the transmission to the first transmission group. In some implementations, the MU-MIMO transmission coordinator 1315 regulates the effective radiated power (ERP) and provides array gain adjustments associated with the transmission to the first transmission group. Additionally, the MU-MIMO transmission coordinator 1315 may provide various channel measurement procedures (e.g., multi-user sounding procedures) and may provide any necessary padding or filler packets associated with the transmission to the first transmission group.

AP 105-*b* may also include a processor 1350, and memory 1355 (including software) 1320, a transceiver 1335, and antenna(s) 1340, each of which may communicate, directly or indirectly, with one another (e.g., via buses 1345). The transceiver 1335 may communicate bi-directionally, via the antenna(s) 1340 or wired or wireless links, with one or more networks, as described above. For example, the transceiver 1335 may communicate bi-directionally with an STA 115 or another AP 105. The transceiver 1335 may include a modem to modulate the packets and provide the modulated packets to the antenna(s) 1340 for transmission, and to demodulate packets received from the antenna(s) 1340. While AP 105-*b* may include a single antenna 1340, AP 105-*b* may also have multiple antennas 1340 capable of concurrently transmitting or receiving multiple wireless transmissions.

The memory 1355 may include random access memory (RAM) and read only memory (ROM). The memory 1355 may store computer-readable, computer-executable software/firmware code 1320 including instructions that, when executed, cause the processor 1350 to perform various features described herein (e.g., MU-MIMO scheduling, etc.). Alternatively, the software/firmware code 1320 may not be directly executable by the processor 1350 but cause a computer (e.g., when compiled and executed) to implement features described herein. The processor 1350 may include an intelligent hardware device, (e.g., a central processing unit (CPU), a microcontroller, an application specific integrated circuit (ASIC), etc.)

The components of wireless device 1100, wireless device 1200, and MU-MIMO manager 1110 may, individually or collectively, be implemented with at least one ASIC adapted to implement some or all of the applicable features in hardware. Alternatively, the features may be implemented by one or more other processing units (or cores), on at least one integrated circuit (IC). In other examples, other types of integrated circuits may be used (e.g., Structured/Platform ASICs, a field programmable gate array (FPGA), or another semi-custom IC), which may be programmed in any manner known in the art. The features of each unit may also be implemented, in whole or in part, with instructions embodied in a memory, formatted to be executed by one or more general or application-specific processors.

Figure 14:
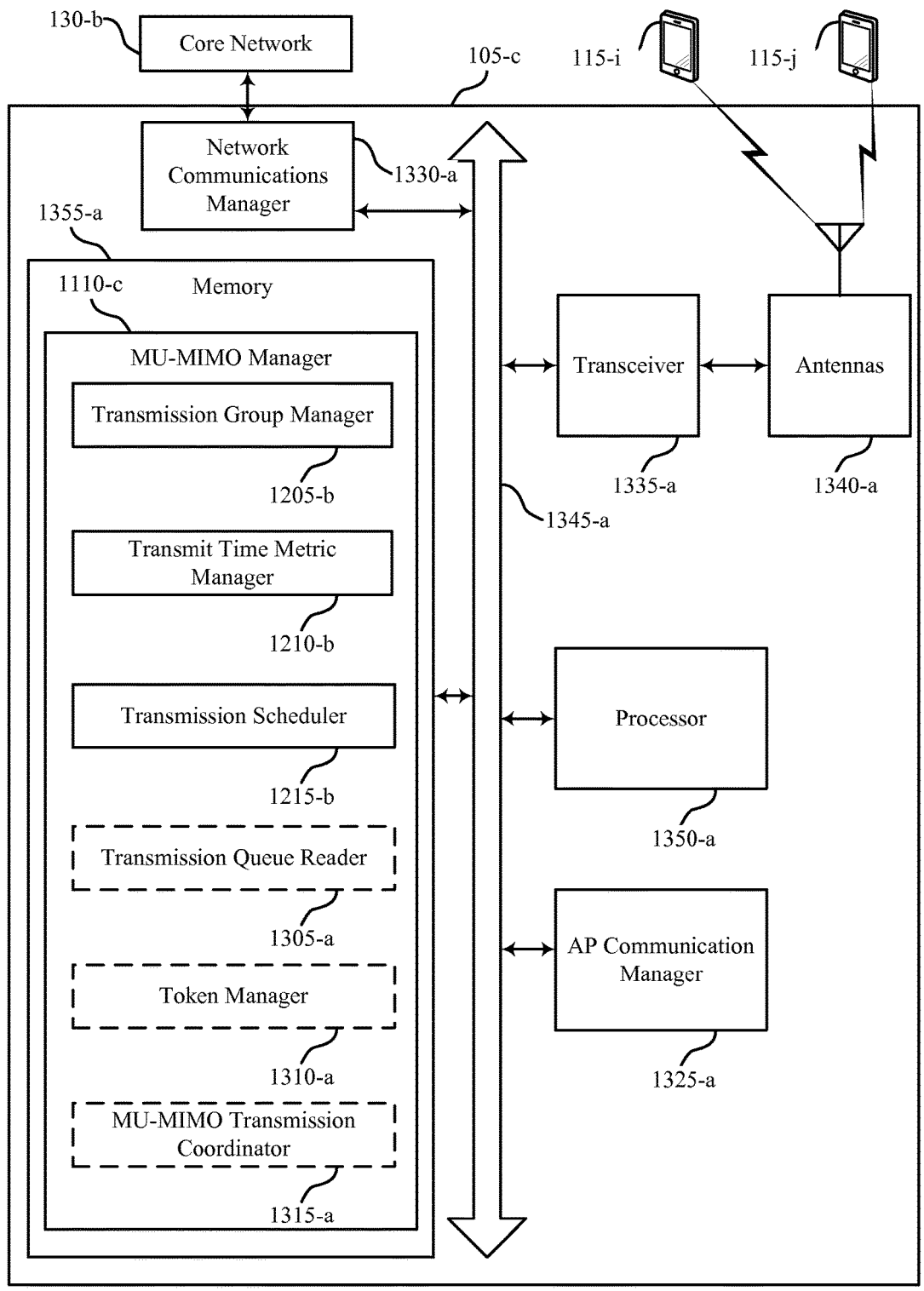
FIG. 14 illustrates a block diagram of a system including an AP that supports MU-MIMO scheduling in accordance with various aspects of the present disclosure.

FIG. 14 shows a diagram of a system 1400 including an AP 105-*c* configured for MU-MIMO scheduling in accordance with various aspects of the present disclosure. AP 105-*c* may be an example of a wireless device 1100, a wireless device 1200, or an AP 105 described with reference to FIGS. 1, 2 and 11-13. AP 105-*c* may include a MU-MIMO manager 1110-*c*, which may be an example of a MU-MIMO manager 1110 described with reference to FIGS. 11-13. The MU-MIMO manager 1110-*c* may include a transmission group manager 1205-*b*, a transmit time metric manager 1210-*b*, and a transmission scheduler 1215-*b*. Each of these components may implement the features described with reference to FIGS. 12-13. The MU-MIMO manager 1110-*c* may also include a transmission queue reader 1305-*a*, a token manager 1310-*a*, and a MU-MIMO transmission coordinator 1315-*a*. Each of these components may implement the features described with reference to FIG. 13. AP 105-*c* may include a processor 1350-*a*, memory 1055-*a*, transceiver 1135-*a*, and antenna(s) 1340-*a*, each of which may implement the features described above with reference to FIG. 13, and each of which may communicate, directly or indirectly, with one another (e.g., via buses 1345-*a*). AP 105-*c* may also include components for bi-directional voice and data communications including components for transmitting communications and components for receiving communications. For example, AP 105-*c* may communicate bi-directionally with STA 115-*i* or STA 115-*j*. The AP 105-*c* may also communicate with a core network 130-*b* through network communications manager 1330-*a*. The AP 105-*c* may communicate with other APs using an APs communications manager 1325-*a*.

In the present example, the memory 1355-a may include software that implements the MU-MIMO manager 1110-c. For example, memory 1355-a may include software that, when compiled and executed, performs the operations of the transmission group manager 1205-b, the transmit time metric manager 1210-b, the transmission scheduler 1215-b, the transmission queue reader 1305-a, the token manager 1310-a, and/or the MU-MIMO transmission coordinator 1315-a, such as described with reference to FIGS. 11-13. In some cases, a portion of MU-MIMO manager 1110-c is implemented in memory 1355-a. In some other cases, all of MU-MIMO manager 1110-c is implemented in software to be executed by the processor 1350-a. For example, the transmission group manager 1205-b, the transmit time metric manager 1210-b, the transmission scheduler 1215-b, the token manager 1310-a, and the MU-MIMO transmission coordinator 1315-a may be implemented as software included the memory 1355-a, while the transmission queue reader 1305-a may be implemented using hardware. Regardless of the distribution, AP 105-c may schedule MU-MIMO transmissions.

Figure 15:
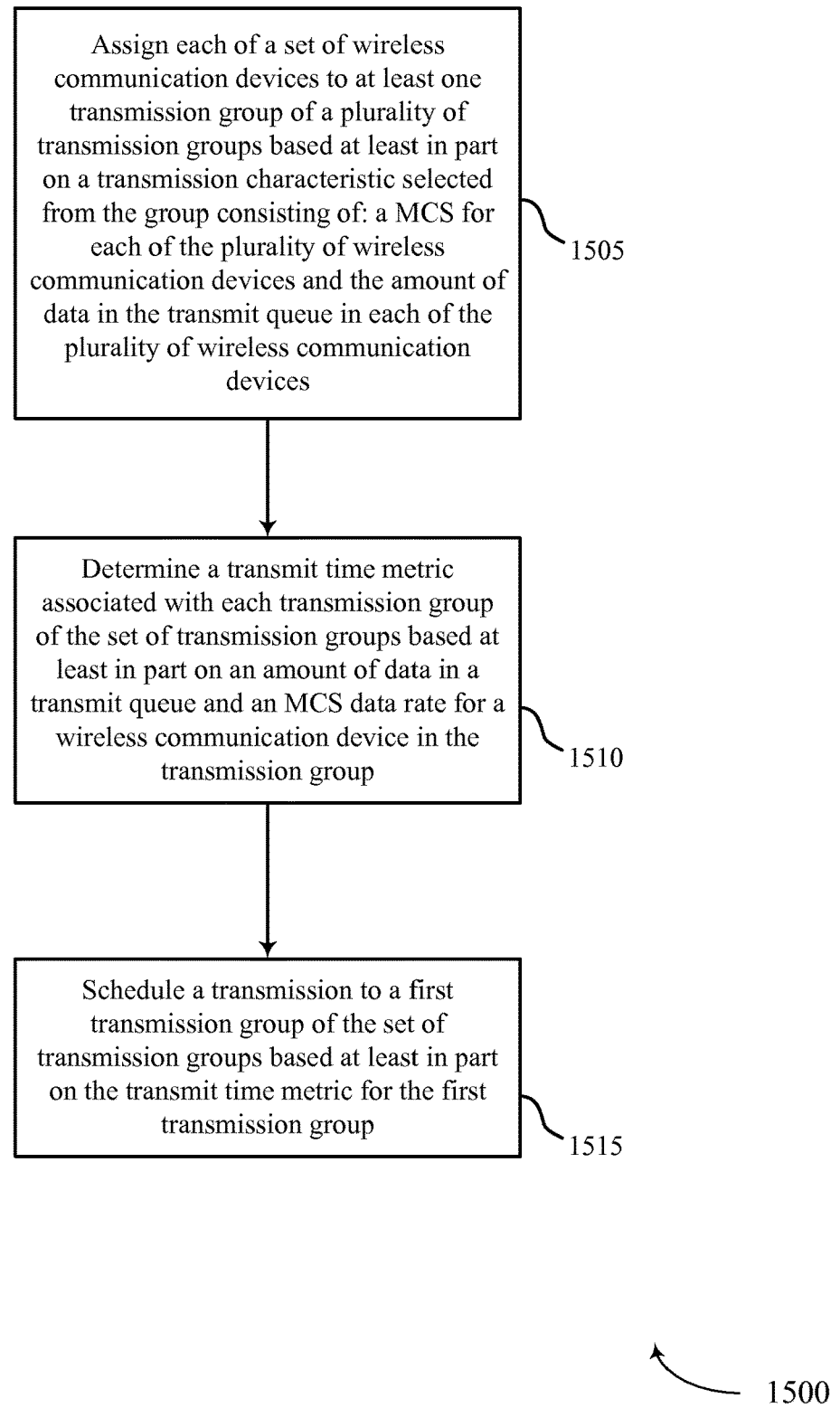
FIGS. 15-20 illustrate methods for MU-MIMO scheduling in accordance with various aspects of the present disclosure.

FIG. 15 shows a flowchart illustrating a method 1500 for MU-MIMO scheduling in accordance with various aspects of the present disclosure. The operations of method 1500 may be implemented by an AP 105 or its components as described with reference to FIGS. 1-14. For example, the operations of method 1500 may be performed by the MU-MIMO manager 1110 as described with reference to FIGS. 11-14. In some examples, an AP 105 executes a set of codes to control the elements of the AP 105 to implement the features described below. Additionally or alternatively, the AP 105 implements aspects of the features described below using special-purpose hardware.

At block 1505, the AP 105 may assign each of a plurality of wireless communication devices to at least one transmission group of the plurality of transmission groups based at least in part on a transmission characteristic selected from the group consisting of: a MCS for each of the plurality of wireless communication devices and an amount of data in the transmit queue in each of the plurality of wireless communication devices as described with reference to FIGS. 2-10. In certain examples, the operations of block 1505 may be performed by the transmission group manager 1205 as described with reference to FIGS. 12-14.

At block 1510, the AP 105 may determine a transmit time metric associated with each transmission group of the plurality of transmission groups based at least in part on an amount of data in a transmit queue and a MCS data rate for at least one wireless communication device in the transmission group as described with reference to FIGS. 2-10. In certain examples, the operations of block 1510 may be performed by the transmit time metric manager 1210 as described with reference to FIGS. 12-14.

At block 1515, the AP 105 may schedule a transmission to a first transmission group of the plurality of transmission groups based at least in part on the transmit time metric for the first transmission group as described with reference to FIGS. 2-10. In certain examples, the operations of block 1515 may be performed by the transmission scheduler 1215 as described with reference to FIGS. 12-14.

Figure 16:
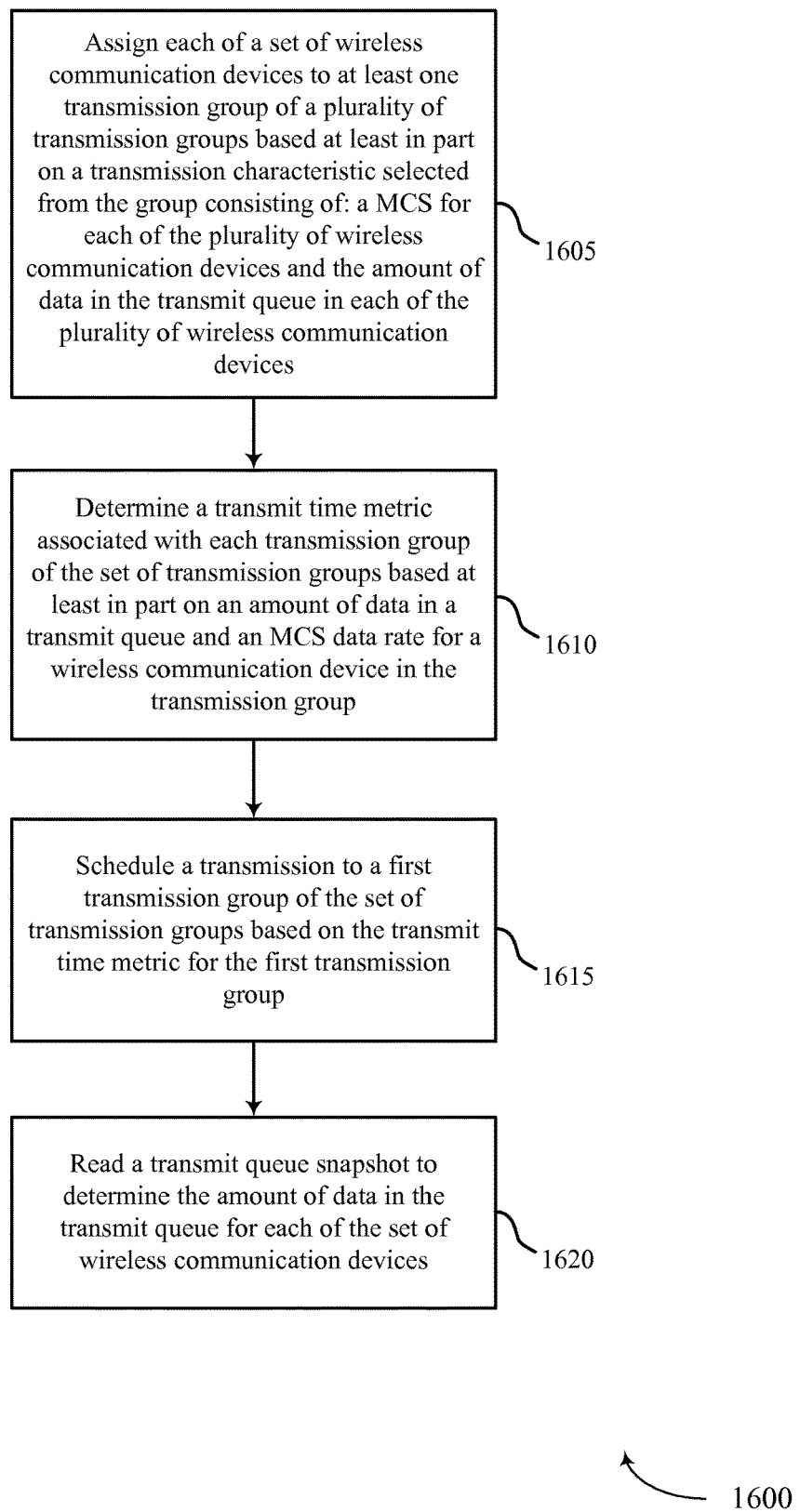

FIG. 16 shows a flowchart illustrating a method 1600 for MU-MIMO scheduling in accordance with various aspects of the present disclosure. The operations of method 1600 may be implemented by an AP 105 or its components as described with reference to FIGS. 1-14. For example, the operations of method 1600 may be performed by the MU-MIMO manager 1110 as described with reference to FIGS. 11-14. In some examples, an AP 105 executes a set of codes to control the elements of the AP 105 to implement the features described below. Additionally or alternatively, the AP 105 implements aspects of the features described below using special-purpose hardware. The method 1600 may also incorporate aspects of method 1500 of FIG. 15.

At block 1605, the AP 105 may assign each of a plurality of wireless communication devices to at least one transmission group of the plurality of transmission groups based at least in part on a transmission characteristic selected from the group consisting of: a MCS for each of the plurality of wireless communication devices and an amount of data in the transmit queue in each of the plurality of wireless communication devices as described with reference to FIGS. 2-10. In certain examples, the operations of block 1605 may be performed by the transmission group manager 1205 as described with reference to FIGS. 12-14.

At block 1610, the AP 105 may determine a transmit time metric associated with each transmission group of the plurality of transmission groups based at least in part on an amount of data in a transmit queue and a MCS data rate for at least one wireless communication device in the transmission group as described with reference to FIGS. 2-10. In certain examples, the operations of block 1610 may be performed by the transmit time metric manager 1210 as described with reference to FIGS. 12-14.

At block 1615, the AP 105 may schedule a transmission to a first transmission group of the plurality of transmission groups based at least in part on the transmit time metric for the first transmission group as described with reference to FIGS. 2-10. In certain examples, the operations of block 1615 may be performed by the transmission scheduler 1215 as described with reference to FIGS. 12-14.

At block 1620, the AP 105 may read a transmit queue snapshot to determine the amount of data in the transmit queue for each of the plurality of wireless communication devices as described with reference to FIGS. 2-10. In certain examples, the operations of block 1620 may be performed by the transmission queue reader 1305 as described with reference to FIGS. 13-14.

Figure 17:
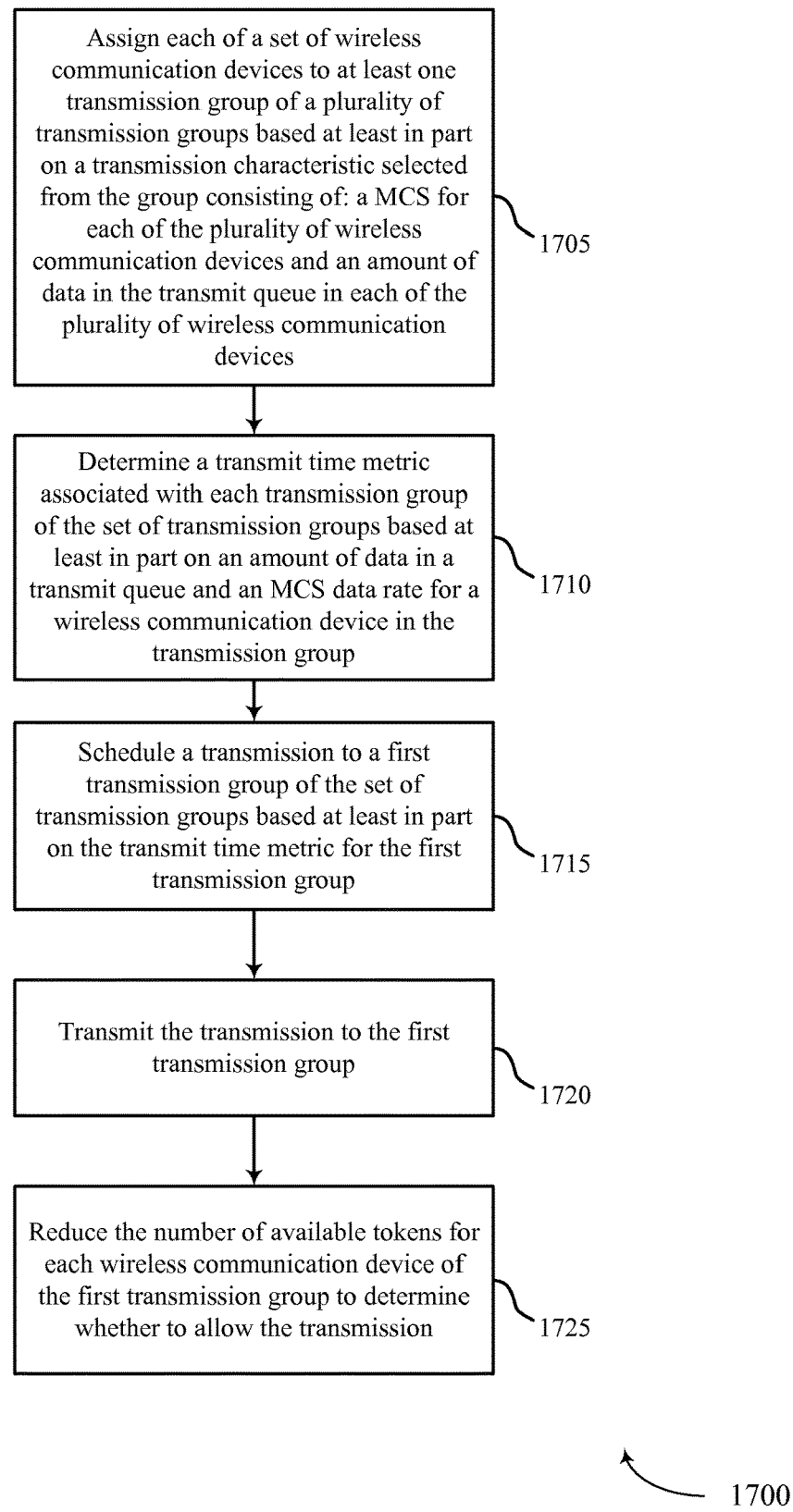

FIG. 17 shows a flowchart illustrating a method 1700 for MU-MIMO scheduling in accordance with various aspects of the present disclosure. The operations of method 1700 may be implemented by an AP 105 or its components as described with reference to FIGS. 1-14. For example, the operations of method 1700 may be performed by the MU-MIMO manager 1110 as described with reference to FIGS. 11-14. In some examples, an AP 105 executes a set of codes to control the elements of the AP 105 to implement the features described below. Additionally or alternatively, the AP 105 implements aspects of the features described below using special-purpose hardware. The method 1700 may also incorporate aspects of methods 1500, and 1600 of FIGS. 15-16.

At block 1705, the AP 105 may assign each of a plurality of wireless communication devices to at least one transmission group of the plurality of transmission groups based at least in part on a transmission characteristic selected from the group consisting of: a MCS for each of the plurality of wireless communication devices and an amount of data in the transmit queue in each of the plurality of wireless communication devices as described with reference to FIGS. 2-10. In certain examples, the operations of block 1705 may be performed by the transmission group manager 1205 as described with reference to FIGS. 12-14.

At block 1710, the AP 105 may determine a transmit time metric associated with each transmission group of the plurality of transmission groups based at least in part on an amount of data in a transmit queue and a MCS data rate for at least one wireless communication device in the transmission group as described with reference to FIGS. 2-10. In certain examples, the operations of block 1710 may be performed by the transmit time metric manager 1210 as described with reference to FIGS. 12-14.

At block 1715, the AP 105 may schedule a transmission to a first transmission group of the plurality of transmission groups based at least in part on the transmit time metric for the first transmission group as described with reference to FIGS. 2-10. In certain examples, the operations of block 1715 may be performed by the transmission scheduler 1215 as described with reference to FIGS. 12-14.

At block 1720, the AP 105 may transmit the transmission to the first transmission group as described with reference to FIGS. 2-10. In certain examples, the operations of block 1720 may be performed by the MU-MIMO transmission coordinator 1315 as described with reference to FIGS. 13-14.

At block 1725, the AP 105 may reduce the number of available tokens for each wireless communication device of the first transmission group to determine whether to allow the transmission as described with reference to FIGS. 2-10. The token cost may also be based at least in part on a type of the transmission associated with the first transmission group. In certain examples, the operations of block 1725 may be performed by the token manager 1310 as described with reference to FIGS. 13-14.

Figure 18:
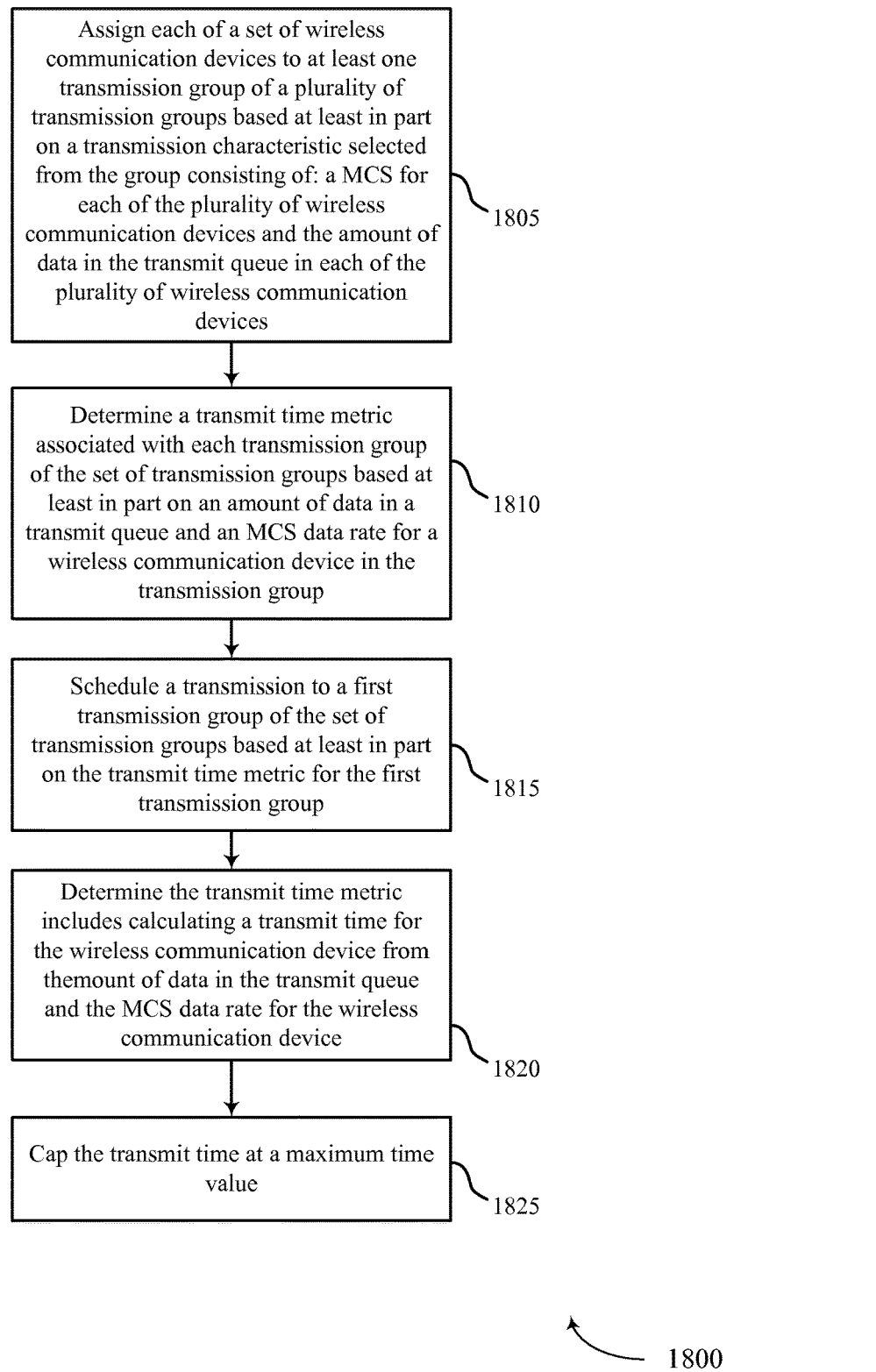

FIG. 18 shows a flowchart illustrating a method 1800 for MU-MIMO scheduling in accordance with various aspects of the present disclosure. The operations of method 1800 may be implemented by an AP 105 or its components as described with reference to FIGS. 1-14. For example, the operations of method 1800 may be performed by the MU-MIMO manager 1110 as described with reference to FIGS. 11-14. In some examples, an AP 105 executes a set of codes to control the elements of the AP 105 to perform the behavior described below. Additionally or alternatively, the AP 105 may implements aspects of the features described below using special-purpose hardware. The method 1800 may also incorporate aspects of methods 1500, 1600, and 1700 of FIGS. 15-17.

At block 1805, the AP 105 may assign each of a plurality of wireless communication devices to at least one transmission group of the plurality of transmission groups based at least in part on a transmission characteristic selected from the group consisting of: a MCS for each of the plurality of wireless communication devices and an amount of data in the transmit queue in each of the plurality of wireless communication devices as described with reference to FIGS. 2-10. In certain examples, the operations of block 1805 may be performed by the transmission group manager 1205 as described with reference to FIGS. 12-14.

At block 1810, the AP 105 may determine a transmit time metric associated with each transmission group of the plurality of transmission groups based at least in part on an amount of data in a transmit queue and a MCS data rate for at least one wireless communication device in the transmission group as described with reference to FIGS. 2-10. In certain examples, the operations of block 1810 may be performed by the transmit time metric manager 1210 as described with reference to FIGS. 12-14.

At block 1815, the AP 105 may schedule a transmission to a first transmission group of the plurality of transmission groups based at least in part on the transmit time metric for the first transmission group as described with reference to FIGS. 2-10. In certain examples, the operations of block 1815 may be performed by the transmission scheduler 1215 as described with reference to FIGS. 12-14.

At block 1820, the AP 105 may determine the transmit time metric comprises calculating a transmit time for the at least one wireless communication device from the amount of data in the transmit queue and the MCS data rate for the at least one wireless communication device as described with reference to FIGS. 2-10. In certain examples, the operations of block 1820 may be performed by the transmit time metric manager 1210 as described with reference to FIGS. 12-14.

At block 1825, the AP 105 may cap the transmit time at a maximum time value as described with reference to FIGS. 2-10. In certain examples, the operations of block 1825 may be performed by the transmit time metric manager 1210 as described with reference to FIGS. 12-14.

Figure 19:
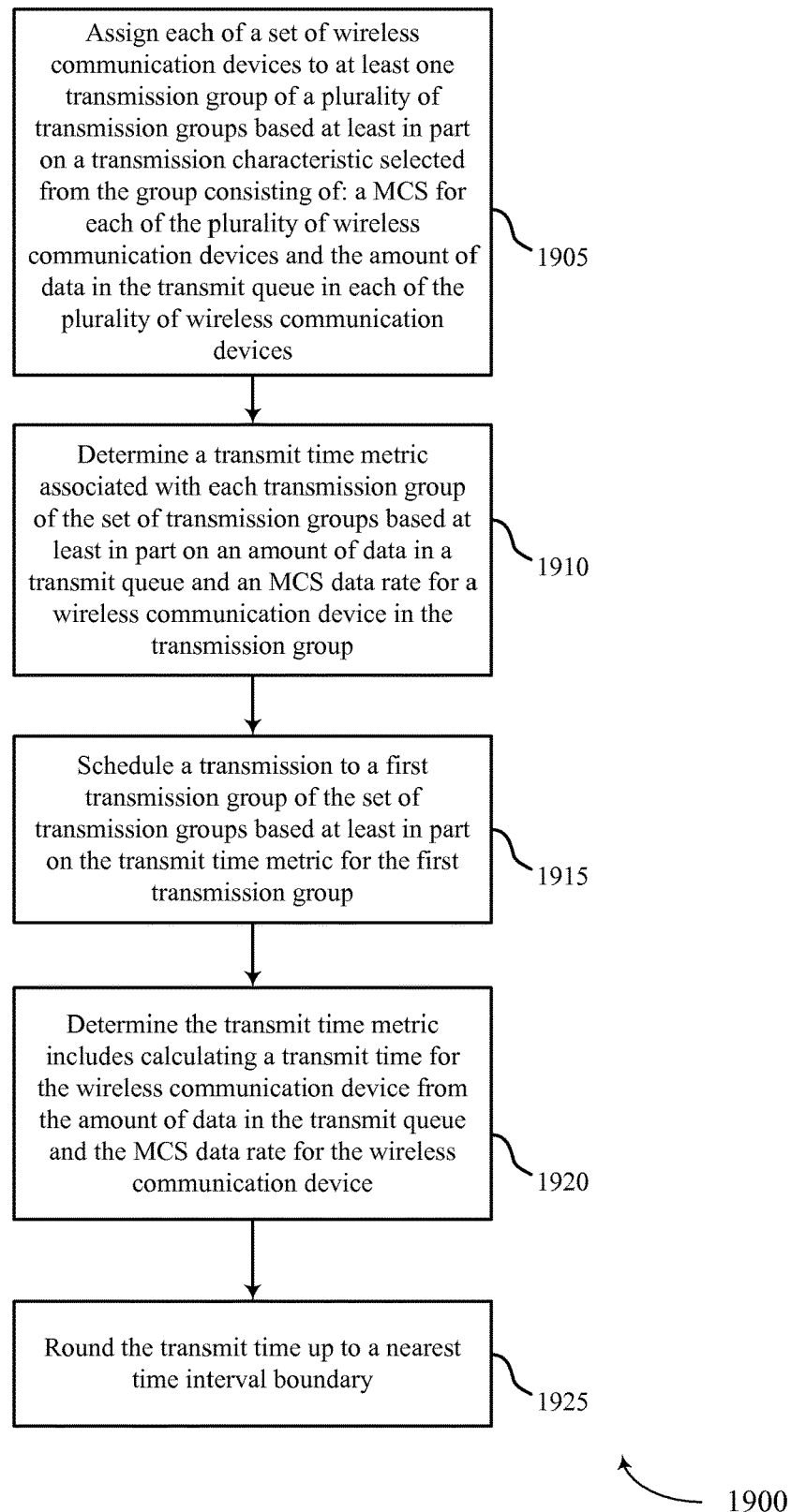

FIG. 19 shows a flowchart illustrating a method 1900 for MU-MIMO scheduling in accordance with various aspects of the present disclosure. The operations of method 1900 may be implemented by an AP 105 or its components as described with reference to FIGS. 1-14. For example, the operations of method 1900 may be performed by the MU-MIMO manager 1110 as described with reference to FIGS. 11-14. In some examples, an AP 105 executes a set of codes to control the elements of the AP 105 to implement the features described below. Additionally or alternatively, the AP 105 implements aspects of the features described below using special-purpose hardware. The method 1900 may also incorporate aspects of methods 1500, 1600, 1700, and 1800 of FIGS. 15-18.

At block 1905, the AP 105 may assign each of a plurality of wireless communication devices to at least one transmission group of the plurality of transmission groups based at least in part on a transmission characteristic selected from the group consisting of: a MCS for each of the plurality of wireless communication devices and an amount of data in the transmit queue in each of the plurality of wireless communication devices as described with reference to FIGS. 2-10. In certain examples, the operations of block 1905 may be performed by the transmission group manager 1205 as described with reference to FIGS. 12-14.

At block 1910, the AP 105 may determine a transmit time metric associated with each transmission group of the plurality of transmission groups based at least in part on an amount of data in a transmit queue and a MCS data rate for at least one wireless communication device in the transmission group as described with reference to FIGS. 2-10. In certain examples, the operations of block 1910 may be performed by the transmit time metric manager 1210 as described with reference to FIGS. 12-14.

At block 1915, the AP 105 may schedule a transmission to a first transmission group of the plurality of transmission groups based at least in part on the transmit time metric for the first transmission group as described with reference to FIGS. 2-10. In certain examples, the operations of block 1915 may be performed by the transmission scheduler 1215 as described with reference to FIGS. 12-14.

At block 1920, the AP 105 may determine the transmit time metric comprises calculating a transmit time for the at least one wireless communication device from the amount of data in the transmit queue and the MCS data rate for the at least one wireless communication device as described with reference to FIGS. 2-10. In certain examples, the operations of block 1920 may be performed by the transmit time metric manager 1210 as described with reference to FIGS. 12-14.

At block 1925, the AP 105 may round the transmit time up to a nearest time interval boundary as described with reference to FIGS. 2-10. In certain examples, the operations of block 1925 may be performed by the transmit time metric manager 1210 as described with reference to FIGS. 12-14.

Figure 20:
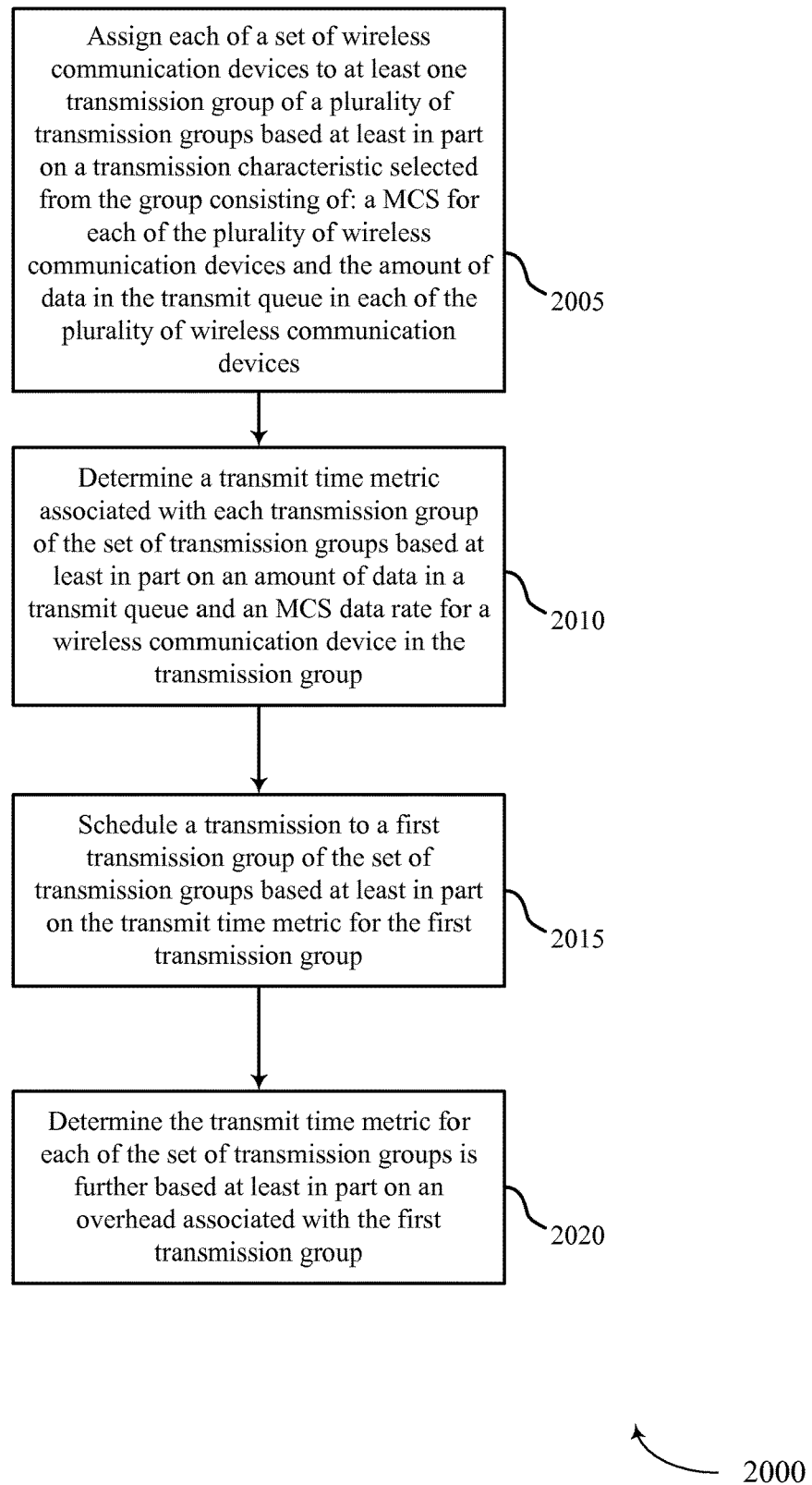

FIG. 20 shows a flowchart illustrating a method 2000 for MU-MIMO scheduling in accordance with various aspects of the present disclosure. The operations of method 2000 may be implemented by an AP 105 or its components as described with reference to FIGS. 1-14. For example, the operations of method 2000 may be performed by the MU-MIMO manager 1110 as described with reference to FIGS. 11-14. In some examples, an AP 105 executes a set of codes to control the elements of the AP 105 to implement the features described below. Additionally or alternatively, the AP 105 implements aspects of the features described below using special-purpose hardware. The method 2000 may also incorporate aspects of methods 1500, 1600, 1700, 1800, and 1900 of FIGS. 15-19.

At block 2005, the AP 105 may assign each of a plurality of wireless communication devices to at least one transmission group of the plurality of transmission groups based at least in part on a transmission characteristic selected from the group consisting of: a MCS for each of the plurality of wireless communication devices and an amount of data in the transmit queue in each of the plurality of wireless communication devices as described with reference to FIGS. 2-10. In certain examples, the operations of block 2005 may be performed by the transmission group manager 1205 as described with reference to FIGS. 12-14.

At block 2010, the AP 105 may determine a transmit time metric associated with each transmission group of the plurality of transmission groups based at least in part on an amount of data in a transmit queue and a MCS data rate for at least one wireless communication device in the transmission group as described with reference to FIGS. 2-10. In certain examples, the operations of block 2010 may be performed by the transmit time metric manager 1210 as described with reference to FIGS. 12-14.

At block 2015, the AP 105 may schedule a transmission to a first transmission group of the plurality of transmission groups based at least in part on the transmit time metric for the first transmission group as described with reference to FIGS. 2-10. In certain examples, the operations of block 2015 may be performed by the transmission scheduler 1215 as described with reference to FIGS. 12-14.

At block 2020, the AP 105 may determine the transmit time metric for each of the plurality of transmission groups is further based at least in part on an overhead associated with the first transmission group as described with reference to FIGS. 2-10. The overhead associated with the first transmission group may also be based at least in part on a multi-user sounding procedure transmission time. In certain examples, the operations of block 2020 may be performed by the transmit time metric manager 1210 as described with reference to FIGS. 12-14.

Thus, methods 1500, 1600, 1700, 1800, 1900, and 2000 may provide for MU-MIMO scheduling. It should be noted that methods 1500, 1600, 1700, 1800, 1900, and 2000 describe possible implementation, and that the operations and the steps may be rearranged or otherwise modified such that other implementations are possible. In some examples, aspects from two or more of the methods 1500, 1600, 1700, 1800, 1900, and 2000 are combined.

The description herein provides examples, and is not limiting of the scope, applicability, or examples set forth in the claims. Changes may be made in the arrangement of elements discussed without departing from the scope of the disclosure. Various examples may omit, substitute, or add various procedures or components as appropriate. Also, features described with respect to some examples are combinable.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to implement the features described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The features described herein may be implemented in hardware, software executed by a processor, firmware, or any combination thereof. If implemented in software executed by a processor, the features may be stored on or transmitted over as one or more instructions or code on a computer-readable medium. Other examples and implementations are within the scope of the disclosure and appended claims. For example, due to the nature of software, features described above can be implemented using software executed by a processor, hardware, firmware, hardwiring, or combinations of any of these. Features may also be physically located at various positions, including being distributed such that portions of features are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method for wireless communication, comprising:
   determining that a first wireless communication device and a second wireless communication device of a plurality of wireless communication devices are compatible for a multi-user transmission based at least in part on a shared bandwidth between the first and second wireless communication devices;
   determining a transmit time metric associated with each transmission group of a plurality of transmission groups, wherein the transmit time metric for a first transmission group is based at least in part on an amount of data in a transmit queue and a modulation and coding scheme (MCS) data rate for the first wireless communication device and an amount of data in the transmit queue and an MCS data rate for the second wireless communication device in the first transmission group; and
   scheduling a transmission to the first transmission group of the plurality of transmission groups based at least in part on the transmit time metric for the first transmission group.

2. The method of claim 1, further comprising:
   assigning each of the plurality of wireless communication devices to at least one transmission group of the plurality of transmission groups based at least in part on a transmission characteristic selected from the group consisting of: a MCS for each of the plurality of wireless communication devices and the amount of data in the transmit queue in each of the plurality of wireless communication devices.

3. The method of claim 1, further comprising:
   reading a transmit queue snapshot to determine the amount of data in the transmit queue for each of the plurality of wireless communication devices.

4. The method of claim 1, wherein scheduling the transmission to the first transmission group further comprises:
   checking a number of available tokens for each wireless communication device of the first transmission group to determine whether to allow the transmission.

5. The method of claim 4, further comprising:
   transmitting the transmission to the first transmission group; and
   reducing the number of available tokens by a token cost.

6. The method of claim 5, wherein the token cost is based at least in part on a type of the transmission associated with the first transmission group.

7. The method of claim 5, wherein the token cost is greater when the transmission of the first transmission group is a single-user transmission than when the transmission of the first transmission group is a multi-user transmission.

8. The method of claim 1, wherein determining the transmit time metric comprises:
   calculating a transmit time for the at least one wireless communication device from the amount of data in the transmit queue and the MCS data rate for the at least one wireless communication device; and
   capping the transmit time at a maximum time value.

9. The method of claim 1, wherein determining the transmit time metric comprises:
   calculating a transmit time for the at least one wireless communication device from the amount of data in the transmit queue and the MCS data rate for the at least one wireless communication device; and
   rounding the transmit time up to a nearest time interval boundary.

10. The method of claim 1, wherein determining the transmit time metric for each of the plurality of transmission groups is further based at least in part on an overhead associated with the first transmission group.

11. The method of claim 10, wherein the overhead associated with the first transmission group is based at least in part on a multi-user sounding procedure transmission time.

12. A communications device for wireless communication, comprising:
   a transmission group manager to determine that a first wireless communication device and a second wireless communication device of a plurality of wireless communication devices are compatible for a multi-user transmission based at least in part on a shared bandwidth between the first and second wireless communication devices;
   a transmit time metric manager to determine a transmit time metric associated with each transmission group of a plurality of transmission groups, wherein the transmit time metric for a first transmission group is based at least in part on an amount of data in a transmit queue and a modulation and coding scheme (MCS) data rate for the first wireless communication device and an amount of data in the transmit queue and an MCS data rate for the second wireless communication device in the first transmission group; and
   a transmission scheduler to schedule the transmission to a first transmission group of the plurality of transmission groups based at least in part on the transmit time metric for the first transmission group.

13. The communications device of claim 12, further comprising:
a transmission group manager to assign each of the plurality of wireless communication devices to at least one transmission group of the plurality of transmission groups based at least in part on a transmission characteristic selected from the group consisting of: a MCS for each of the plurality of wireless communication devices and the amount of data in the transmit queue in each of the plurality of wireless communication devices.

14. The communications device of claim 12, further comprising:
a transmission queue reader to read a transmit queue snapshot to determine the amount of data in the transmit queue for each of the plurality of wireless communication devices.

15. The communications device of claim 12, wherein the transmission scheduler is further to:
check a number of available tokens for each wireless communication device of the first transmission group to determine whether to allow the transmission.

16. The communications device of claim 15, further comprising:
a multi-user multiple-input-multiple-output (MU-MIMO) transmission coordinator to transmit the transmission to the first transmission group; and
the token manager to reduce the number of available tokens by a token cost.

17. The communications device of claim 16, wherein the token cost is based at least in part on a type of the transmission associated with the first transmission group.

18. The communications device of claim 16, wherein the token cost is greater when the transmission of the first transmission group is a single-user transmission than when the transmission of the first transmission group is a multi-user transmission.

19. The communications device of claim 12, wherein the transmit time metric manager is further to:
calculate a transmit time for the at least one wireless communication device from the amount of data in the transmit queue and the MCS data rate for the at least one wireless communication device; and
cap the transmit time at a maximum time value.

20. The communications device of claim 12, wherein the transmit time metric manager is further to:
calculate a transmit time for the at least one wireless communication device from the amount of data in the transmit queue and the MCS data rate for the at least one wireless communication device; and
round the transmit time up to a nearest time interval boundary.

21. The communications device of claim 12, wherein the transmit time metric manager determines the transmit time metric for each of the plurality of transmission groups based at least in part on an overhead associated with the first transmission group.

22. The communications device of claim 21, wherein the overhead associated with the first transmission group is based at least in part on a multi-user sounding procedure transmission time.

23. A communications device for wireless communication, comprising:
means for determining that a first wireless communication device and a second wireless communication device of a plurality of wireless communication devices are compatible for a multi-user transmission based at least in part on a shared bandwidth between the first and second wireless communication devices;
means for determining a transmit time metric associated with each transmission group of a plurality of transmission groups, wherein the transmit time metric for a first transmission group is based at least in part on an amount of data in a transmit queue and a modulation and coding scheme (MCS) data rate for the first wireless communication device and an amount of data in the transmit queue and an MCS data rate for the second wireless communication device in the first transmission group; and
means for scheduling a transmission to the first transmission group of the plurality of transmission groups based at least in part on the transmit time metric for the first transmission group.

24. The communications device of claim 23, further comprising:
means for assigning each of the plurality of wireless communication devices to at least one transmission group of the plurality of transmission groups based at least in part on a transmission characteristic selected from the group consisting of: a MCS for each of the plurality of wireless communication devices and the amount of data in the transmit queue in each of the plurality of wireless communication devices.

25. The communications device of claim 23, further comprising:
means for reading a transmit queue snapshot to determine the amount of data in the transmit queue for each of the plurality of wireless communication devices.

26. The communications device of claim 23, wherein the means for scheduling the transmission to the first transmission group further comprises:
means for checking a number of available tokens for each wireless communication device of the first transmission group to determine whether to allow the transmission.

27. The communications device of claim 26, further comprising:
means for transmitting the transmission to the first transmission group; and
means for reducing the number of available tokens by a token cost.

28. The communications device of claim 23, wherein the means for determining the transmit time metric comprises:
means for calculating a transmit time for the at least one wireless communication device from the amount of data in the transmit queue and the MCS data rate for the at least one wireless communication device; and
means for capping the transmit time at a maximum time value.

29. The communications device of claim 23, wherein the means for determining the transmit time metric comprises:
means for calculating a transmit time for the at least one wireless communication device from the amount of data in the transmit queue and the MCS data rate for the at least one wireless communication device; and
means for rounding the transmit time up to a nearest time interval boundary.

30. A non-transitory computer-readable medium storing code for wireless communication, the code comprising instructions executable to cause at least one communications device to:
determine that a first wireless communication device and a second wireless communication device of a plurality of wireless communication devices are compatible for a multi-user transmission based at least in part on a shared bandwidth between the first and second wireless communication devices;

determine a transmit time metric associated with each transmission group of a plurality of transmission groups, wherein the transmit time metric for a first transmission group is based at least in part on an amount of data in a transmit queue and a modulation and coding scheme (MCS) data rate for the first wireless communication device and an amount of data in the transmit queue and an MCS data rate for the second wireless communication device in the first transmission group; and schedule a transmission to the first transmission group of the plurality of transmission groups based at least in part on the transmit time metric for the first transmission group.

* * * * *